United States Patent
Wang et al.

(10) Patent No.: US 12,428,777 B2
(45) Date of Patent: Sep. 30, 2025

(54) ALCOHOL REPELLENT TREATED NONWOVEN

(71) Applicant: AVINTIV Specialty Materials Inc., Charlotte, NC (US)

(72) Inventors: Lei Wang, Mooresville, NC (US); Nyle Bishop, Mooresville, NC (US)

(73) Assignee: AVINTIV SPECIALTY MATERIALS INC., Charlotte, NC (US)

( * ) Notice: Subject to any disclaimer, the term of this patent is extended or adjusted under 35 U.S.C. 154(b) by 602 days.

(21) Appl. No.: 15/166,398

(22) Filed: May 27, 2016

(65) Prior Publication Data

US 2016/0348307 A1 Dec. 1, 2016

Related U.S. Application Data

(60) Provisional application No. 62/167,998, filed on May 29, 2015.

(51) Int. Cl.
| | |
|---|---|
| *D06M 15/277* | (2006.01) |
| *C09D 7/63* | (2018.01) |
| *D06M 23/16* | (2006.01) |
| C09D 133/06 | (2006.01) |
| D06M 101/20 | (2006.01) |

(52) U.S. Cl.
CPC ............ *D06M 15/277* (2013.01); *C09D 7/63* (2018.01); *D06M 23/16* (2013.01); *C09D 133/06* (2013.01); *D06M 2101/20* (2013.01); *D06M 2200/10* (2013.01)

(58) Field of Classification Search
CPC ........ D06M 15/277; D06M 23/16; C09D 7/63
USPC ....................................................... 442/171
See application file for complete search history.

(56) References Cited

U.S. PATENT DOCUMENTS

| | | | |
|---|---|---|---|
| 4,041,203 A * | 8/1977 | Brock ................... | B32B 5/08 428/157 |
| 4,082,887 A | 4/1978 | Coates | |
| 4,411,928 A | 10/1983 | Baldwin | |
| 7,931,457 B2 | 4/2011 | Johnson et al. | |
| 8,216,646 B2 * | 7/2012 | Flippin ............... | D06M 13/248 427/209 |
| 2003/0045193 A1* | 3/2003 | Snowden ............. | D06M 23/16 442/110 |
| 2003/0207628 A1 | 11/2003 | Pierce | |

(Continued)

FOREIGN PATENT DOCUMENTS

| | | | | |
|---|---|---|---|---|
| CN | 1615383 A | | 5/2005 | |
| EP | 458356 A | * | 11/1991 | .......... D06M 15/277 |
| JP | S52140700 | | 11/1977 | |

OTHER PUBLICATIONS

Second Written Opinion of the International Preliminary Examining Authority of corresponding International Application No. PCT/2016/034543 mailed May 9, 2017, all enclosed pages cited.

International Search Report and Written Opinion of corresponding International Application No. PCT/US2016/034543, mailed Aug. 11, 2016, all enclosed pages cited.

Office Action issued in corresponding Chinese patent application No. 201680044474.3 on Oct. 8, 2019, all enclosed pages cited.

(Continued)

*Primary Examiner* — Vincent Tatesure
(74) *Attorney, Agent, or Firm* — BURR & FORMAN

(57) ABSTRACT

Alcohol repellent fabrics having a wide variety of uses (e.g., surgical drapes, surgical gowns, etc.) are provided. The alcohol repellent fabric includes a fibrous substrate and an alcohol repellent composition (ARC). The ARC includes at least one fluorochemical and at least one binder.

27 Claims, 5 Drawing Sheets

(56) References Cited

U.S. PATENT DOCUMENTS

| | | | |
|---|---|---|---|
| 2004/0045186 A1 | 3/2004 | Cleary et al. | |
| 2006/0110997 A1* | 5/2006 | Snowden | D06M 15/576 |
| | | | 442/79 |
| 2007/0131892 A1* | 6/2007 | Valenti | C11D 3/0015 |
| | | | 252/8.61 |
| 2007/0264520 A1* | 11/2007 | Wood | B32B 27/02 |
| | | | 428/606 |
| 2009/0124154 A1* | 5/2009 | Harrington | C08L 23/14 |
| | | | 442/329 |
| 2012/0164906 A1 | 6/2012 | Yahiaoui et al. | |
| 2014/0364028 A1* | 12/2014 | Minami | C08L 33/16 |
| | | | 442/80 |
| 2015/0038037 A1* | 2/2015 | Coppens | C09D 133/16 |
| | | | 525/131 |

OTHER PUBLICATIONS

English translation of Office Action issued in corresponding Chinese patent application No. 201680044474.3 on Oct. 8, 2019, all enclosed pages cited.

Office Action issued in corresponding Japanese patent application No. 2017-561853 on Jan. 28, 2020, all enclosed pages cited.

English translation of Office Action issued in corresponding Japanese patent application No. 2017-561853 on Jan. 28, 2020, all enclosed pages cited.

Office Action issued in corresponding Chinese patent application No. 201680044474.3 on Jul. 3, 2020, all enclosed pages cited.

Office Action issued in corresponding Japanese patent application No. 2017-561853 on Oct. 27, 2020, all enclosed pages cited.

Office Action issued in corresponding Chinese Application No. 201680044474.3 on Mar. 2, 2021, all enclosed pages cited.

* cited by examiner

ALCOHOL REPELLENT TREATED NONWOVEN

PRIORITY CLAIM

This application claims priority under 35 U.S.C. § 119(e) to U.S. Provisional Application Ser. No. 62/167,998, filed on May 29, 2015, which is expressly incorporated by reference herein in its entirety.

TECHNICAL FIELD

The presently-disclosed invention relates generally to barrier fabrics, such as alcohol repellent fabrics, having various commercial applications.

BACKGROUND

Alcohol repellent fabrics are frequently used in surgical drapes and gowns. These fabrics often consist of barrier fabrics treated with fluorochemicals to enhance resistance to penetration by isopropyl alcohol. Until recently, C8 fluorochemicals were commonly used in such applications, but there has been a shift toward treating fabrics with C6 fluorochemicals instead. However, because C6 fluorochemicals have fewer fluorinated carbons, the fabric must be treated with a higher level of C6 fluorochemicals to achieve the same alcohol repellency achieved by the C8 fluorochemicals. Because C6 fluorochemicals are expensive, the cost of alcohol repellent fabric has increased tremendously.

Therefore there at least remains a need in the art for a formulation that would provide the necessary level of alcohol repellency while using a lesser quantity of a fluorochemical treatment on fabrics.

SUMMARY OF INVENTION

One or more embodiments of the invention may address one or more of the aforementioned problems. Certain embodiments according to the invention provide topically-treated alcohol repellent fabrics suitable for a wide variety of uses (e.g., surgical drapes, surgical gowns, etc.). In one aspect, the topically-treated alcohol repellent fabric includes a fibrous substrate and an alcohol repellent composition (ARC). The ARC may comprise at least one fluorochemical and at least one binder.

In accordance with certain embodiments of the invention, the ARC may be directly or indirectly disposed over at least a portion of an outer surface of the fibrous substrate. In certain embodiments of the invention, the ARC may permeate through a portion or a complete thickness of the fibrous substrate. In some embodiments of the invention, the ARC may comprise a dry coating after being subjected to a drying operation or allowing to dry naturally. The dry coating, in accordance with certain embodiments, may at least partially encase or surround one or more fibers of the fibrous substrate. In accordance with certain embodiments of the invention, a majority of the individual fibers present at or proximate to the outer surface or surfaces of the fabric may be at least partially encased by the coating of the ARC (e.g., a dry coating of the ARC). The ARC coating (e.g., a dry coating of the ARC) may extend throughout substantially the entirety of the thickness of the fabric, or at least about 25% of the thickness of the fabric. In other embodiment of the invention, the ARC coating (e.g., a dry coating of the ARC) may extend throughout no more than about 25% of the thickness of the fabric.

In accordance with certain embodiments of the invention, the fibrous substrate may comprise at least one nonwoven. In some embodiments of the invention, the at least one nonwoven may comprise at least one layer of staple fibers. In other embodiments of the invention, the at least one nonwoven may comprise at least one layer of continuous filaments. In further embodiments of the invention, the at least one nonwoven may comprise at least one layer of fine fibers.

According to certain embodiments of the invention, the at least one nonwoven may comprise a first continuous filament layer, a second continuous filament layer, and one or at least two fine fiber layers adjacent to the first continuous filament layer and the second continuous filament layer. In such embodiments of the invention, the at least two fine fiber layers may have a combined basis weight from about 5 gsm to about 30 gsm. In other embodiments of the invention, the at least two fine fiber layers may have a combined basis weight from about 10 gsm to about 20 gsm. In further embodiments of the invention, the at least two fine fiber layers may have a combined basis weight from about 12 gsm to about 15 gsm. In some embodiments of the invention, each of the first continuous filament layer and the second continuous filament layer may have a basis weight from about 10 gsm to about 50 gsm. In other embodiments of the invention, each of the first continuous filament layer and the second continuous filament layer may have a basis weight from about 15 gsm to about 30 gsm. In further embodiments of the invention, each of the first continuous filament layer and the second continuous filament layer may have a basis weight from about 20 gsm to about 25 gsm.

According to certain embodiments of the invention, the at least one nonwoven may comprise a wood pulp layer and a synthetic fiber layer, for example, such that the wood pulp layer and the synthetic fiber layer are hydroentangled together. In other embodiments of the invention, the at least one nonwoven may comprise at least one of a polyolefin, a polyester, a polyamide, a natural fiber, a cellulosic fiber, or any combination thereof. In some embodiments of the invention, the at least one nonwoven may comprise at least one of a polypropylene, a polyethylene, a polyester, a polyamide, cotton, rayon, a wood fiber, or any combination thereof. In certain embodiments of the invention, the at least one nonwoven may comprise a polypropylene. In further embodiments of the invention, the at least one nonwoven may comprise a polyethylene. In some embodiments of the invention, the at least one nonwoven may comprise bicomponent fibers. In other embodiments of the invention, the fibrous substrate may comprise at least one woven layer.

In accordance with certain embodiments of the invention, the at least one fluorochemical may comprise at least one of a C4-C10 fluorochemical. In some embodiments of the invention, the at least one fluorochemical may comprise at least one of a C4 fluorochemical, a C6 fluorochemical, a C8 fluorochemical, a C10 fluorochemical, or any combination thereof. In further embodiments of the invention, the at least one fluorochemical may comprise a C6 fluorochemical. In certain embodiments of the invention, the at least one fluorochemical may comprise a perfluoroalkylethylmethacrylate.

In accordance with certain embodiments of the invention, the at least one binder may comprise at least one of an acrylic binder, a styrene-butadiene rubber binder, a vinyl copolymer binder, a vinyl acetate binder, an ethylene vinyl acetate binder, a polyvinyl chloride binder, a polyurethane binder, or any combination thereof. In some embodiments of the invention, the at least one binder may comprise an acrylic binder. In further embodiments of the invention, the acrylic binder may comprise an anionic acrylic binder, a cationic acrylic binder, or a non-ionic acrylic binder. In certain embodiments of the invention, the acrylic binder may comprise a non-ionic acrylic binder. In some embodiments of the invention, the non-ionic acrylic binder may comprise a self cross-linking non-ionic acrylic binder.

In accordance with certain embodiments of the invention, the ARC may further comprise at least one antistatic agent. Further pursuant to these embodiments of the invention, the at least one antistatic agent may comprise at least one of a non-ionic antistatic agent, an anionic antistatic agent, a cationic antistatic agent, an amphoteric antistatic agent, or any combination thereof. In some embodiments of the invention, the at least one antistatic agent may comprise an anionic antistatic agent. In further embodiments of the invention, the at least one antistatic agent may comprise, for example, an alkylphosphate or a phosphate ester.

In accordance with certain embodiments of the invention, the ARC may further comprise at least one surfactant. In such embodiments of the invention, the at least one surfactant may have a surface tension of less than 30 dynes.

In accordance with certain embodiments of the invention, the ARC may comprise about 0.065-0.6 wt % fluorochemical and about 0.02-0.4 wt % binder, each on a dry basis. In other embodiments of the invention, the ARC may comprise about 0.08-0.45 wt % fluorochemical and about 0.04-0.3 wt % binder, each on a dry basis. In further embodiments of the invention, the ARC may comprise about 0.1-0.35 wt % fluorochemical and about 0.05-0.2 wt % binder, each on a dry basis.

In accordance with certain embodiments of the invention, the alcohol repellent fabric may have an alcohol repellency rating of at least 7, as measured by the harmonized test method WSP 80.8. In further embodiments of the invention, the alcohol repellent fabric may have an alcohol repellency rating of at least 8. According to certain embodiments of the invention, the alcohol repellent fabric may have a static decay as tested per condition TC1 from about 0.01 seconds to about 0.5 seconds, as measured by standard test method NFPA 99 performed at 50% R.H. using 10% remaining charge as the cut-off level. In other embodiments of the invention, the alcohol repellent fabric may have a static decay as tested per condition TC1 from about 0.1 seconds to about 0.45 seconds. In further embodiments of the invention, the alcohol repellent fabric may have a static decay as tested per condition TC1 from about 0.125 seconds to about 0.4 seconds. According to certain embodiments of the invention, the alcohol repellent fabric may have a hydrohead from about 75 mbar to about 100 mbar, as measured by standard test method EN 20811 and ramping up the pressure at a rate of 60 mbar/min. In other embodiments of the invention, the alcohol repellent fabric may have a hydrohead from about 80 mbar to about 95 mbar. In further embodiments of the invention, the alcohol repellent fabric may have a hydrohead from about 80 mbar to about 90 mbar. According to certain embodiments of the invention, the alcohol repellent fabric may have a bonding pattern on a surface, and the bonding pattern may comprise from about 5-25% of the alcohol repellent fabric surface. In other embodiments of the invention, the bonding pattern may comprise from about 10-20% of the alcohol repellent fabric surface. In further embodiments of the invention, the bonding pattern may comprise from about 16-18% of the alcohol repellent fabric surface.

In accordance with certain embodiments of the invention, the dried alcohol repellent fabric may have a weight ratio of fluorochemical to binder from about 0.5-10:1 (e.g., 0.5-2:1), as measured on a dry basis. In other embodiments of the invention, the dried alcohol repellent fabric may have a weight ratio of fluorochemical to binder from about 0.75-5:1, as measured on a dry basis. In further embodiments of the invention, the dried alcohol repellent fabric may have a weight ratio of fluorochemical to binder from about 0.75-3:1, as measured on a dry basis. In accordance with certain embodiments of the invention, the ARC and/or alcohol repellent fabric may comprise a weight ratio of fluorochemical to binder, as measured on a dry basis, from at least any of the following: 0.2:1, 0.25:1, 0.3:1, 0.4:1, 0.5:1, 0.6:1, 0.7:1, 0.75:1, and 0.9:1 and/or at most about any of the following 10:1, 8:1, 6:1, 5:1, 4:1, 3:1, 2.5:1, 2:1, and 1:1 (e.g., 0.2-10:1, 0.5-3:1. 0.75-2:1, etc.).

According to certain embodiments of the invention, the dried alcohol repellent fabric may comprise an ARC comprising from about 0.065-0.6 wt % fluorochemical and about 0.02-0.4 wt % binder, each on a dry basis. In other embodiments of the invention, the dried alcohol repellent fabric may comprise an ARC comprising from about 0.08-0.45 wt % fluorochemical and about 0.04-0.3 wt % binder, each on a dry basis. In further embodiments of the invention, the dried alcohol repellent fabric may comprise an ARC comprising from about 0.1-0.35 wt % fluorochemical emulsion and about 0.08-0.2 wt % binder, each on a dry basis.

In another aspect, certain embodiments of the invention provide a process for forming a topically-treated, alcohol repellent fabric. The process includes providing a fibrous substrate and topically applying an alcohol repellent composition (ARC) to at least a portion of an outer surface of the fibrous substrate to form the alcohol repellent fabric. The ARC may comprise at least one fluorochemical and at least one binder. According to certain embodiments of the invention, topically applying the ARC to the fibrous substrate may comprise at least one of padding, spraying, printing, foaming, or any combination thereof.

In accordance with certain embodiments of the invention, the process may further comprise removing excess ARC from the alcohol repellent fabric and drying the alcohol repellent fabric to provide a dried alcohol repellent fabric. In such embodiments of the invention, the step of removing excess ARC (e.g., in a liquid form) from the alcohol repellent fabric, by way of a non-limiting example only, may comprise processing the alcohol repellent fabric through a pair of rolls which squeeze excess liquid-ARC out of the fabric. In certain embodiments of the invention the alcohol repellent fabric may comprise a wet content of from about 40 wt % to about 100 wt % (e.g., from about 60 wt % to about 75 wt %) after the step or removing excess ARC and prior to drying (e.g., passive drying or active drying step).

In accordance with certain embodiments of the invention, the fibrous substrate may comprise at least one nonwoven. In some embodiments of the invention, the at least one nonwoven may comprise at least one layer of staple fibers. In other embodiments of the invention, the at least one nonwoven may comprise at least one layer of continuous filaments. In further embodiments of the invention, the at least one nonwoven may comprise at least one layer of fine fibers.

According to certain embodiments of the invention, the at least one nonwoven may comprise a first continuous filament layer, a second continuous filament layer, and at least two fine fiber layers adjacent to the first continuous filament layer and the second continuous filament layer. In such embodiments of the invention, the at least two fine fiber layers may have a combined basis weight from about 5 gsm to about 30 gsm. In other embodiments of the invention, the at least two fine fiber layers may have a combined basis weight from about 10 gsm to about 20 gsm. In further embodiments of the invention, the at least two fine fiber layers may have a combined basis weight from about 12 gsm to about 15 gsm. In some embodiments of the invention, each of the first continuous filament layer and the second continuous filament layer may have a basis weight from about 10 gsm to about 50 gsm. In other embodiments of the invention, each of the first continuous filament layer and the second continuous filament layer may have a basis weight from about 15 gsm to about 30 gsm. In further embodiments of the invention, each of the first continuous filament layer and the second continuous filament layer may have a basis weight from about 20 gsm to about 25 gsm.

According to certain embodiments of the invention, the at least one nonwoven may comprise a wood pulp layer and a synthetic fiber layer, for example, such that the wood pulp layer and the synthetic fiber layer are hydroentangled together. In other embodiments of the invention, the at least one nonwoven may comprise at least one of a polyolefin, a polyester, a polyamide, a natural fiber, a cellulosic fiber, or any combination thereof. In some embodiments of the invention, the at least one nonwoven may comprise at least one of a polypropylene, a polyethylene, a polyester, a polyamide, cotton, rayon, a wood fiber, or any combination thereof. In certain embodiments of the invention, the at least one nonwoven may comprise a polypropylene. In further embodiments of the invention, the at least one nonwoven may comprise a polyethylene. In some embodiments of the invention, the at least one nonwoven may comprise bicomponent fibers. In other embodiments of the invention, the fibrous substrate may comprise at least one woven layer.

In accordance with certain embodiments of the invention, the at least one fluorochemical may comprise at least one of a C4-C10 fluorochemical. In some embodiments of the invention, the at least one fluorochemical may comprise at least one of a C4 fluorochemical, a C6 fluorochemical, a C8 fluorochemical, a C10 fluorochemical, or any combination thereof. In further embodiments of the invention, the at least one fluorochemical may comprise a C6 fluorochemical. In certain embodiments of the invention, the at least one fluorochemical may comprise a perfluoroalkylethylmethacrylate.

In accordance with certain embodiments of the invention, the at least one binder may comprise at least one of an acrylic binder, a styrene-butadiene rubber binder, a vinyl copolymer binder, a vinyl acetate binder, an ethylene vinyl acetate binder, a polyvinyl chloride binder, a polyurethane binder, or any combination thereof. In some embodiments of the invention, the at least one binder may comprise an acrylic binder. In further embodiments of the invention, the acrylic binder may comprise an anionic acrylic binder, a cationic acrylic binder, or a non-ionic acrylic binder. In certain embodiments of the invention, the acrylic binder may comprise a non-ionic acrylic binder. In some embodiments of the invention, the non-ionic acrylic binder may comprise a self cross-linking non-ionic acrylic binder.

In accordance with certain embodiments of the invention, the ARC may further comprise at least one antistatic agent. In such embodiments of the invention, the at least one antistatic agent may comprise at least one of a non-ionic antistatic agent, an anionic antistatic agent, a cationic antistatic agent, an amphoteric antistatic agent, or any combination thereof. In some embodiments of the invention, the at least one antistatic agent may comprise an anionic antistatic agent. In further embodiments of the invention, the at least one antistatic agent may comprise an alkylphosphate.

In accordance with certain embodiments of the invention, the ARC may further comprise at least one surfactant. In such embodiments of the invention, the at least one surfactant may have a surface tension of less than 30 dynes.

In accordance with certain embodiments of the invention, the ARC may comprise about 0.065-0.6 wt % fluorochemical and about 0.02-0.4 wt % binder, each on a dry basis. In other embodiments of the invention, the ARC may comprise about 0.08-0.45 wt % fluorochemical and about 0.04-0.3 wt % binder, each on a dry basis. In further embodiments of the invention, the ARC may comprise about 0.1-0.35 wt % fluorochemical and about 0.05-0.2 wt % binder, each on a dry basis. According to certain embodiments of the invention, the dried alcohol repellent fabric may have a weight ratio of fluorochemical to binder from about 0.5-10:1 (e.g., 0.5-2:1), as measured on a dry basis. In other embodiments of the invention, the dried alcohol repellent fabric may have a weight ratio of fluorochemical to binder from about 0.75-5:1, as measured on a dry basis. In further embodiments of the invention, the dried alcohol repellent fabric may have a weight ratio of fluorochemical to binder from about 0.75-3:1, as measured on a dry basis. In accordance with certain embodiments of the invention, the ARC and/or alcohol repellent fabric may comprise a weight ratio of fluorochemical to binder, as measured on a dry basis, from at least any of the following: 0.2:1, 0.25:1, 0.3:1, 0.4:1, 0.5:1, 0.6:1, 0.7:1, 0.75:1, and 0.9:1 and/or at most about any of the following 10:1, 8:1, 6:1, 5:1, 4:1, 3:1, 2.5:1, 2:1, and 1:1 (e.g., 0.2-10:1, 0.5-3:1. 0.75-2:1, etc.).

According to certain embodiments of the invention, the dried alcohol repellent fabric may comprise an ARC comprising about 0.065-0.6 wt % fluorochemical and about 0.02-0.4 wt % binder, each on a dry basis. In other embodiments of the invention, the dried alcohol repellent fabric may comprise an ARC comprising about 0.08-0.45 wt % fluorochemical and about 0.04-0.3 wt % binder, each on a dry basis. In further embodiments of the invention, the dried alcohol repellent fabric may comprise an ARC comprising about 0.1-0.35 wt % fluorochemical and about 0.08-0.2 wt % binder, each on a dry basis.

In accordance with certain embodiments of the invention, the alcohol repellent fabric may have an alcohol repellency rating of at least 5, or at least 6, or at least 7, as measured by the harmonized test method WSP 80.8. In further embodiments of the invention, the alcohol repellent fabric may have an alcohol repellency rating of at least 8, as measured by the harmonized test method WSP 80.8. According to certain embodiments of the invention, the alcohol repellent fabric may have a static decay as per method TC1 from about 0.01 seconds to about 0.5 seconds, as measured by standard test method NFPA 99 performed at 50% R.H. using 10% remaining charge as the cut-off level. In other embodiments of the invention, the alcohol repellent fabric may have a static decay as per method TC1 from about 0.1 seconds to about 0.45 seconds. In further embodiments of the invention, the alcohol repellent fabric may have a static decay as per method TC1 from about 0.125 seconds to about 0.4 seconds. According to certain embodiments of the invention, the alcohol repellent fabric may have a hydrohead from about 75 mbar to about 100 mbar, as measured by standard test method EN 20811 and ramping up the pressure at a rate of 60 mbar/min. In other embodiments of the invention, the alcohol repellent fabric may have a hydrohead from about 80 mbar to about 95 mbar (e.g., about 80 mbar to about 90 mbar). In further embodiments of the invention, the alcohol repellent fabric may have a hydrohead from about 80 mbar to about 90 mbar. According to certain embodiments of the invention, the alcohol repellent fabric may have a bonding pattern on a surface, and the bonding pattern may comprise from about 5-25% of the alcohol repellent fabric surface. In other embodiments of the invention, the bonding pattern may comprise from about 10-20% of the alcohol repellent fabric surface. In further embodiments of the invention, the bonding pattern may comprise from about 16-18% of the alcohol repellent fabric surface.

In yet another aspect, certain embodiments of the invention provide an alcohol repellent composition (ARC). The ARC, in accordance with certain embodiments, may include at least one fluorochemical and at least one binder.

In accordance with certain embodiments of the invention, the ARC may comprise an emulsion, a solution, a suspension, or a colloid. In some embodiments of the invention, the ARC may comprise an emulsion or a solution. According to certain embodiments of the invention, the ARC may have a weight ratio of fluorochemical to binder from about 0.5-10:1, as measured on a dry basis. In other embodiments of the invention, the ARC may have a weight ratio of fluorochemical to binder from about 0.5-2.7:1, as measured on a dry basis. In further embodiments of the invention, the ARC may have a weight ratio of fluorochemical to binder from about 0.75-2.7:1, as measured on a dry basis. In accordance with certain embodiments of the invention, the ARC may comprise a weight ratio of fluorochemical to binder, as measured on a dry basis, from at least any of the following: 0.2:1, 0.25:1, 0.3:1, 0.4:1, 0.5:1, 0.6:1, 0.7:1, 0.75:1, and 0.9:1 and/or at most about any of the following 10:1, 8:1, 6:1, 5:1, 4:1, 3:1, 2.5:1, 2:1, and 1:1 (e.g., 0.2-10:1, 0.5-3:1. 0.75-2:1, etc.).

In accordance with certain embodiments of the invention, the at least one fluorochemical may comprise at least one of a C4-C10 fluorochemical. In some embodiments of the invention, the at least one fluorochemical may comprise at least one of a C4 fluorochemical, a C6 fluorochemical, a C8 fluorochemical, a C10 fluorochemical, or any combination thereof. In further embodiments of the invention, the at least one fluorochemical may comprise a C6 fluorochemical. In certain embodiments of the invention, the at least one fluorochemical may comprise a perfluoroalkylethylmethacrylate.

In accordance with certain embodiments of the invention, the at least one binder may comprise at least one of an acrylic binder, a styrene-butadiene rubber binder, a vinyl copolymer binder, a vinyl acetate binder, an ethylene vinyl acetate binder, a polyvinyl chloride binder, a polyurethane binder, or any combination thereof. In some embodiments of the invention, the at least one binder may comprise an acrylic binder. In further embodiments of the invention, the acrylic binder may comprise an anionic acrylic binder, a cationic acrylic binder, or a non-ionic acrylic binder. In certain embodiments of the invention, the acrylic binder may comprise a non-ionic acrylic binder. In some embodiments of the invention, the non-ionic acrylic binder may comprise a self cross-linking non-ionic acrylic binder.

In accordance with certain embodiments of the invention, the ARC may further comprise at least one antistatic agent. In such embodiments of the invention, the at least one antistatic agent may comprise at least one of a non-ionic antistatic agent, an anionic antistatic agent, a cationic antistatic agent, an amphoteric antistatic agent, or any combination thereof. In some embodiments of the invention, the at least one antistatic agent may comprise an anionic antistatic agent. In further embodiments of the invention, the at least one antistatic agent may comprise an alkylphosphate.

In accordance with certain embodiments of the invention, the ARC may further comprise at least one surfactant. In such embodiments of the invention, the at least one surfactant may have a surface tension of less than 30 dynes.

In accordance with certain embodiments of the invention, the ARC may comprise about 0.065-0.6 wt % fluorochemical and about 0.02-0.4 wt % binder, each on a dry basis. In other embodiments of the invention, the ARC may comprise about 0.08-0.45 wt % fluorochemical and about 0.04-0.35 wt % binder, each on a dry basis. In further embodiments of the invention, the ARC may comprise about 0.1-0.35 wt % fluorochemical and about 0.08-0.2 wt % binder, each on a dry basis.

BRIEF DESCRIPTION OF THE DRAWING(S)

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein.

DETAILED DESCRIPTION

Figure 1:
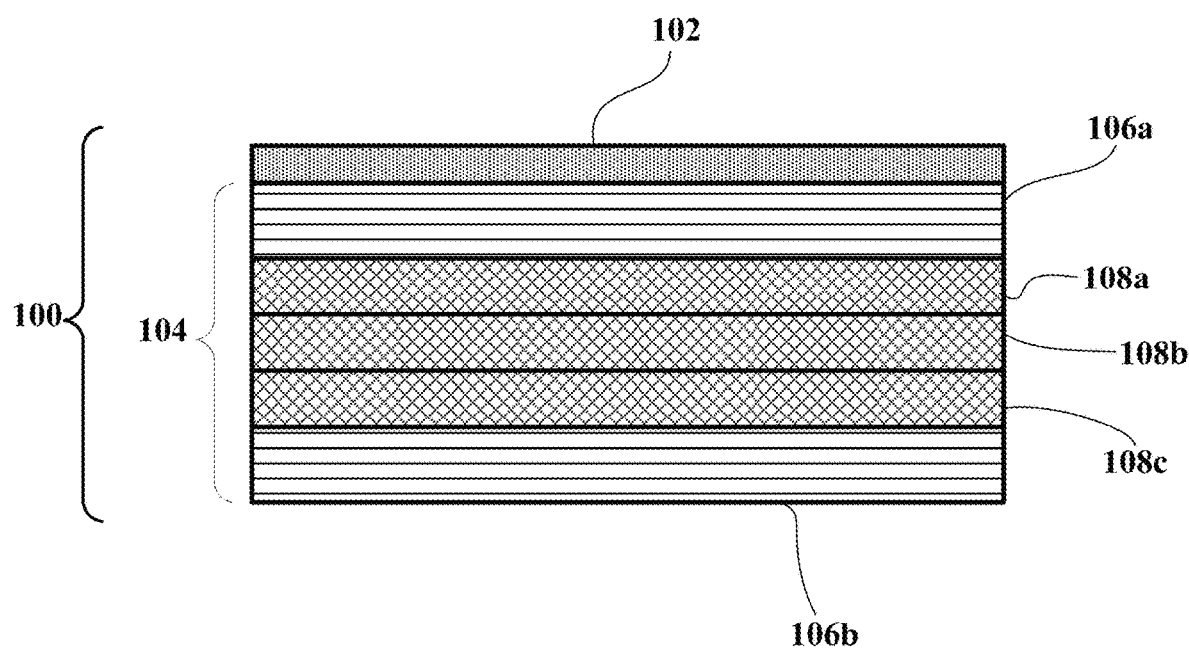
FIG. 1 illustrates a cross sectional view of an alcohol repellent fabric according to an embodiment of the invention.

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The invention includes, according to certain embodiments, a topically-treated alcohol repellent fabric based, at least in part, on a fibrous substrate and an alcohol repellent composition (ARC). Alcohol repellent fabrics, according to certain embodiments of the invention, may exhibit at least the necessary level of alcohol repellency for surgical applications using less, such as less than half, the amount of fluorochemical typically applied to such fabrics. In this regard, certain embodiments of the invention provide a topically treated barrier nonwoven fabric comprising a desired alcohol repellency while also including a reduced fluorochemical content.

The inventors have discovered that fibrous substrates treated with a combination of a fluorochemical, such as C4-C10 fluorochemicals, and a binder, such as an acrylic binder, surprisingly provide a barrier fabric (e.g., a nonwoven) having improved alcohol repellency per content of fluorochemical applied to the fibrous substrate. Moreover, fabrics treated with an ARC in accordance with certain embodiments of the invention also simultaneously demonstrate a desired or necessary static decay value (e.g., under 0.5 seconds when tested as per method TC1 as discussed below) for barrier applications (e.g., surgical drapes and gowns). Even more surprising, fibrous substrates treated with an ARC according to certain embodiments of the invention may also exhibit the desired or necessary hydrohead value for barrier applications (e.g., surgical drapes and gowns). In this regard, alcohol repellent fabrics according to certain embodiments of the invention, in which a fibrous substrate has been topically treated with an ARC composition as disclosed herein, may simultaneously provide the desired or necessary alcohol repellency, hydrohead, and static decay for a variety of barrier applications (e.g., surgical drapes and gowns). Moreover, these desirable yet surprising results may be achieved according to certain embodiments of the invention via the combination of a generally reduced level of fluorochemicals and a minor amount of a binder (e.g., an acrylic binder). As discussed in more detail below, combining fluorochemicals with a minor amount of a suitable binder (as disclosed herein) significantly increases the repellent efficiency of the fluorochemicals such that a notably reduced quantity of fluorochemicals can be used to provide a desired level of alcohol repellency. In this regard, the present invention provides ARC's, alcohol repellent fabrics (e.g., fabrics treated with an ARC as disclosed herein), and processes for forming alcohol repellent fabrics.

I. DEFINITIONS

The terms "polymer" or "polymeric", as used interchangeably herein, may comprise homopolymers, copolymers, such as, for example, block, graft, random, and alternating copolymers, terpolymers, etc., and blends and modifications thereof. Furthermore, unless otherwise specifically limited, the term "polymer" or "polymeric" shall include all possible structural isomers; stereoisomers including, without limitation, geometric isomers, optical isomers or enantionmers; and/or any chiral molecular configuration of such polymer or polymeric material. These configurations include, but are not limited to, isotactic, syndiotactic, and atactic configurations of such polymer or polymeric material.

The terms "nonwoven" and "nonwoven web", as used herein, may comprise a web having a structure of individual fibers, filaments, and/or threads that are interlaid but not in an identifiable repeating manner as in a knitted or woven fabric. Nonwoven fabrics or webs, according to certain embodiments of the invention, may be formed by any process conventionally known in the art such as, for example, meltblowing processes, spunbonding processes, hydroentangling, air-laid, and bonded carded web processes.

The term "layer", as used herein, may comprise a generally recognizable combination of similar material types and/or functions existing in the X-Y plane.

The term "spunbond", as used herein, may comprise fibers which are formed by extruding molten thermoplastic material as filaments from a plurality of fine, usually circular, capillaries of a spinneret with the diameter of the extruded filaments then being rapidly reduced. According to an embodiment of the invention, spunbond fibers are generally not tacky when they are deposited onto a collecting surface and may be generally continuous. It is noted that the spunbond used in certain composites of the invention may include a nonwoven described in the literature as SPIN-LACE®.

The term "fine fibers", as used herein, may comprise meltblown fibers, melt film fibrillation fibers, sub-micron fibers and the like. As used herein, the term "melt film fibrillation" may comprise a process including the steps of utilizing a central fluid stream to form an elongated hollow polymeric film tube and using high velocity air to shear multiple nanofibers from the hollow tube or, it may also comprise the step of utilizing a fluid stream to form an elongated film and shear it into fine fibers on the straight edge of a die as described in U.S. Pat. No. 7,931,457. Fine fibers, according to certain embodiments of the invention, may have an average diameter ranging from about 1 µm to about 3 µm. In the case of fibers having a non-circular cross-section, the average diameter refers to the axis with the largest diameter of the fiber cross-section. In still other embodiments of the invention, the fine fibers may comprise a higher concentration of nanofibers and have an average diameter ranging from about 0.5 µm to about 2.5 µm. In still other embodiments of the invention, the fine fibers may comprise coarse fibers and have an average diameter of up to about 10 µm.

The term "meltblown", as used herein, may comprise fibers formed by extruding a molten thermoplastic material through a plurality of fine die capillaries as molten threads or filaments into converging high velocity, usually hot, gas (e.g. air) streams which attenuate the filaments of molten thermoplastic material to reduce their diameter, which may be to microfiber diameter, according to certain embodiments of the invention. According to an embodiment of the invention, the die capillaries may be circular. Thereafter, the meltblown fibers are carried by the high velocity gas stream and are deposited on a collecting surface to form a web of randomly disbursed meltblown fibers. Meltblown fibers are microfibers which may be continuous or discontinuous and are generally tacky when deposited onto a collecting surface.

The term "sub-micron nonwoven", as used herein, may comprise fibers having diameters of less than about 1000 nanometers (i.e., one micron). Sub-micron fiber webs may be desired, for example, due to their high surface area and low pore size, among other characteristics. Methods of producing sub-micron fibers include melt fibrillation. Melt fibrillation is a general class of fiber production in which one or more polymers are molten and extruded into many possible configurations (e.g. co-extrusion, homogeneous or bicomponent films or filaments) and then fibrillated or fiberized into fibers. Non-limiting examples of other methods to produce sub-micron fibers comprise melt blowing, melt fiber bursting, melt electroblowing, melt circular spinning and melt film fibrillation. Methods of producing sub-micron fibers not from melts comprise film fibrillation, electro-spinning, and solution spinning. Other methods of producing sub-micron fibers include spinning a larger diameter bi-component fiber in an islands-in-the-sea, segmented pie, or other configuration where the fiber is then further processed so that sub-micron fibers result.

The term "hydroentangle", as used herein, may comprise a process for bonding a nonwoven fabric by using high pressure water jets to intermingle the fibers. Several rows of water jets are directed against the fiber web, which is supported by a movable fabric. Fiber entanglements are introduced by the combined effects of the water jets and the turbulent water created in the web, which intertwines neighboring fibers.

The term "bicomponent fibers", as used herein, may comprise fibers formed from at least two different polymers extruded from separate extruders but spun together to form one fiber. Bicomponent fibers are also sometimes referred to as conjugate fibers or multicomponent fibers. The polymers are arranged in a substantially well-defined position in distinct zones across the cross-section of the bicomponent fibers and extend continuously along the length of the bicomponent fibers. The configuration of such a bicomponent fiber may be, for example, a sheath/core arrangement wherein one polymer is surrounded by another, or may be a side-by-side arrangement, a pie arrangement, or an "islands-in-the-sea" arrangement, each as is known in the art of multicomponent, including bicomponent, fibers. The "bicomponent fibers" may be thermoplastic fibers that comprise a core fiber made from one polymer that is encased within a thermoplastic sheath made from a different polymer or have a side-by-side arrangement of different thermoplastic fibers. The first polymer often melts at a different, typically lower, temperature than the second polymer. In the sheath/core arrangement, these bicomponent fibers provide thermal bonding due to melting of the sheath polymer, while retaining the desirable strength characteristics of the core polymer. In the side-by-side arrangement, the fibers shrink and crimp creating z-direction expansion.

The term "fluorochemical", as used herein, may comprise any of various chemical compounds containing fluorine, particularly organic compounds (e.g., fluorocarbons such as perfluoroalkanes) in which fluorine has replaced a large proportion of the hydrogen attached to the carbons. Fluorochemicals may exhibit low surface tension and low viscosity and are extremely stable due to the strength of the carbon-fluorine bond. Fluorochemicals are not miscible with most organic solvents.

The term "emulsion", as used herein, may comprise a stable mixture of two or more immiscible liquids held in suspension by small percentages of emulsifiers or surfactants. Emulsifiers may be either (1) proteins or carbohydrate polymers which act by coating the surfaces of the dispersed fat or oil particles, thus preventing them from coalescing (i.e., protective colloids); or (2) long-chain alcohols and fatty acids which are able to reduce the surface tension at the interface of the suspended particles because of the solubility properties of their molecules (i.e., detergents). All emulsions comprise a continuous phase and a disperse phase. In oil-in-water (o/w) emulsions, water is the continuous phase and oil is the disperse phase. In water-in-oil (w/o) emulsions, oil is the continuous phase and water droplets are the disperse phase.

The term "solution", as used herein, may comprise a uniformly dispersed mixture at the molecular or ionic level or one or more substances (i.e., solute) in one or more other substances (i.e., solvent). Common types of solutions are liquid-liquid, solid-liquid, and solid-solid solutions.

The term "suspension", as used herein, may comprise a system in which very small particles (e.g., solid, semisolid, or liquid) are more or less uniformly dispersed in a liquid or gaseous medium. If the particles are small enough to pass through filter membranes, the system may be a colloidal suspension. If the particles are larger than colloidal dimensions they will tend to precipitate if heavier than the suspending medium or to agglomerate and rise to the surface if lighter.

The term "colloid", as used herein may comprise a system intermediate between a true solution and a suspension. Colloids are dispersions where the particle size is between 1 and 100 nm. Colloids have little or no tendency to separate-out and small or no freezing-point depression.

The term "dry basis", as used herein may comprise the calculation or measurement of a weight percentage in which the presence of water and/or other solvents (e.g., alcohols) are ignored or excluded for purposes of the calculation or measurement. Weight percentages may frequently be measured on a dry basis to remove the effects of evaporation and/or condensation which may happen naturally throughout the useful life of a composition or article.

The term "laminate", as used herein, may be a structure comprising two or more layers, such as a film layer and a fiber layer. The two layers of a laminate structure may be joined together such that a substantial portion of their common X-Y plane interface, according to certain embodiments of the invention.

The term "film", as used herein, may comprise a polymeric or elastomeric layer made using a film extrusion process, such as a cast film or blown film extrusion process. This term may also include films rendered microporous by mixing polymer and/or elastomer with filler, forming a film from the mixture, and optionally stretching the film.

The term "microporous", as used herein, may comprise films, such as single layer films or multi-layer films, having voids separated by thin polymer and/or elastomer membranes and films having micropores passing through the films. The voids or micropores can be formed when a mixture of polymer and/or elastomer and filler is extruded into a film and the film is stretched, such as uniaxially in the machine or cross-direction.

The term "filler", as used herein, may comprise particles or aggregates of particles and other forms of materials that can be added to a polymeric film blend. According to certain embodiments of the invention, a filler will not substantially chemically interfere with or adversely affect the extruded film. According to certain embodiments of the invention, the filler is capable of being uniformly dispersed throughout the film or a layer comprised in a multilayer film. Fillers may comprise particulate inorganic materials such as, for example, calcium carbonate, various kinds of clay, silica, alumina, barium sulfate, sodium carbonate, talc, magnesium sulfate, titanium dioxide, zeolites, aluminum sulfate, cellulose-type powders, diatomaceous earth, magnesium sulfate, magnesium carbonate, barium carbonate, kaolin, mica, carbon, calcium oxide, magnesium oxide, aluminum hydroxide, glass particles, and the like, and organic particulate materials such as high-melting point polymers (e.g., TEFLON® and KEVLAR® from E.I. DuPont de Nemours and Company), pulp powder, wood powder, cellulose derivatives, chitin and chitin derivatives, and the like. Filler particles may optionally be coated with a fatty acid, such as stearic acid or reduced stearic acid, or a larger chain fatty acid, such as behenic acid. Without intending to be bound by theory, coated filler particles may facilitate the free flow of the particles (in bulk) and their ease of dispersion into the polymer matrix, according to certain embodiments of the invention.

As used herein, the term "monolithic" film may comprise any film that is continuous and substantially free or free of pores. In certain alternative embodiments of the invention, a "monolithic" film may comprise fewer pore structures than would otherwise be found in a microporous film. According to certain non-limiting exemplary embodiments of the invention, a monolithic film may act as a barrier to liquids and particulate matter but allow water vapor to pass through. In addition, without intending to be bound by theory, by achieving and maintaining high breathability, it is possible to provide an article that is more comfortable to wear because the migration of water vapor through the laminate helps reduce and/or limit discomfort resulting from excess moisture trapped against the skin. Thus, such an article can potentially contribute to an overall improved skin wellness. Monolithic films, according to certain embodiments of the invention, may also act as barriers to bacteria and viruses and may provide an article or garment that reduces the contamination of the surroundings and the spread of infections and illness caused by the bacteria and viruses.

The term "highly breathable polymer", as used herein, may comprise any polymer that is selectively permeable to water vapor but substantially impermeable to liquid water and that can form a breathable film. Specifically, according to certain embodiments of the invention, "highly breathable polymer" may comprise any thermoplastic polymer having a MVTR of at least 1000 g/m$^2$/day when formed into a film, such as a film having, for example, a thickness of about 25 microns or less. According to certain embodiments of the invention, highly breathable polymers may comprise, for example, any one or combination of a polyether block amide copolymer (e.g., PEBAX® from Arkema Group), polyester block amide copolymer, copolyester thermoplastic elastomer (e.g., ARNITEL® from DSM Engineering Plastics, HYTREL® from E.I. DuPont de Nemours and Company), or thermoplastic urethane elastomer (TPU).

The terms "elastomer" or "elastomeric", as used interchangeably herein, may comprise any material that upon application of a biasing force, can stretch to an elongated length of at least 110% or even to 125% of its relaxed, original length (i.e., can stretch to at least 10% or even 25% more than its original length), without rupture or breakage. Upon release of the applied force, for example, the material may recover at least 40%, at least 60%, or even at least 80% of its elongation. In certain embodiments of the invention, the material may recover from about 20% to about 100% of its elongation, from about 25% to about 95% of its elongation, from about 30% to about 90% of its elongation, from about 40% to about 80% of its elongation, or from about 50% to about 70% of its elongation. For example, a material that has an initial length of 100 mm can extend at least to 110 mm, and upon removal of the force would retract to a length of 106 mm e.g., exhibiting a 40% recovery), Exemplary elastomers may include Vistamaxx™ propylene-based elastomers (commercially available form ExxonMobile), which comprise copolymers of propylene and ethylene. Vistamaxx™ propylene-based elastomers, for example, comprise isotactic polypropylene microcrystalline regions and random amorphous regions.

The term "non-breathable material", as used herein, may comprise any material that either does not allow water vapor to pass through the material or substantially impedes the movement of water vapor through the material. According to an embodiment of the invention, non-breathable materials may comprise a thermoplastic resin, such as polyethylene, polypropylene, polyester, polyamide, polyethylene vinyl acetate, polyvinyl chloride, or polyvinylidene chloride, or any copolymers or physical blends thereof. In other embodiments of the invention, the thermoplastic resin may comprise or even further comprise, for example, a low density polyethylene (LDPE), linear low density polyethylene (LLDPE), high density polyethylene (HDPE), polypropylene (PP), copolymers or terpolymers of ethylene, or functionalized polymers of ethylene, or any coextrusion or blend thereof.

II. TOPICALLY-TREATED ALCOHOL REPELLENT FABRIC

Certain embodiments according to the invention provide topically-treated alcohol repellent fabrics suitable for a wide variety of uses (e.g., surgical drapes and gowns). In one aspect, the topically-treated alcohol repellent fabric includes a fibrous substrate and an alcohol repellent composition (ARC). The ARC may comprise at least one fluorochemical and at least one binder.

In accordance with certain embodiments of the invention, for example, the ARC may be directly or indirectly disposed over at least a portion of an outer surface of the fibrous substrate and/or throughout a given thickness of the fibrous substrates (e.g., throughout substantially the entire thickness of the fibrous substrate or only a desired portion of the thickness of the fibrous substrate). For example, FIG. 1 illustrates a cross sectional view of a hydroentangled composite according to an embodiment of the invention. As shown in FIG. 1, the alcohol repellent fabric 100 includes a fibrous substrate 104 and an ARC 102 disposed along the outer surface of the fibrous substrate 104. Although FIG. 1 illustrates an embodiment in which the ARC 102 is disposed primarily on the outer surface of the fibrous substrate 104, certain embodiments of the invention comprise the ARC disposed or applied onto a majority of the fibers of the fibrous substrate as discussed in more detail below. For instance, the ARC may be applied to the fibrous substrate in a liquid form and allowed to permeate throughout a portion or the entirety of the fibrous substrate such that substantially all (or at least a majority) of the fibers forming the fibrous substrate are at least partially coated with the ARC. In some embodiments of the invention, for instance, the ARC may be topically applied to the fibrous substrate in a liquid form and either allowed to dry naturally or subjected to an active drying operation to form a dry coating of the ARC. For example, the ARC may be applied as a liquid composition in the form of, for example, an emulsion, solution, colloid, or suspension.

Figure 4:
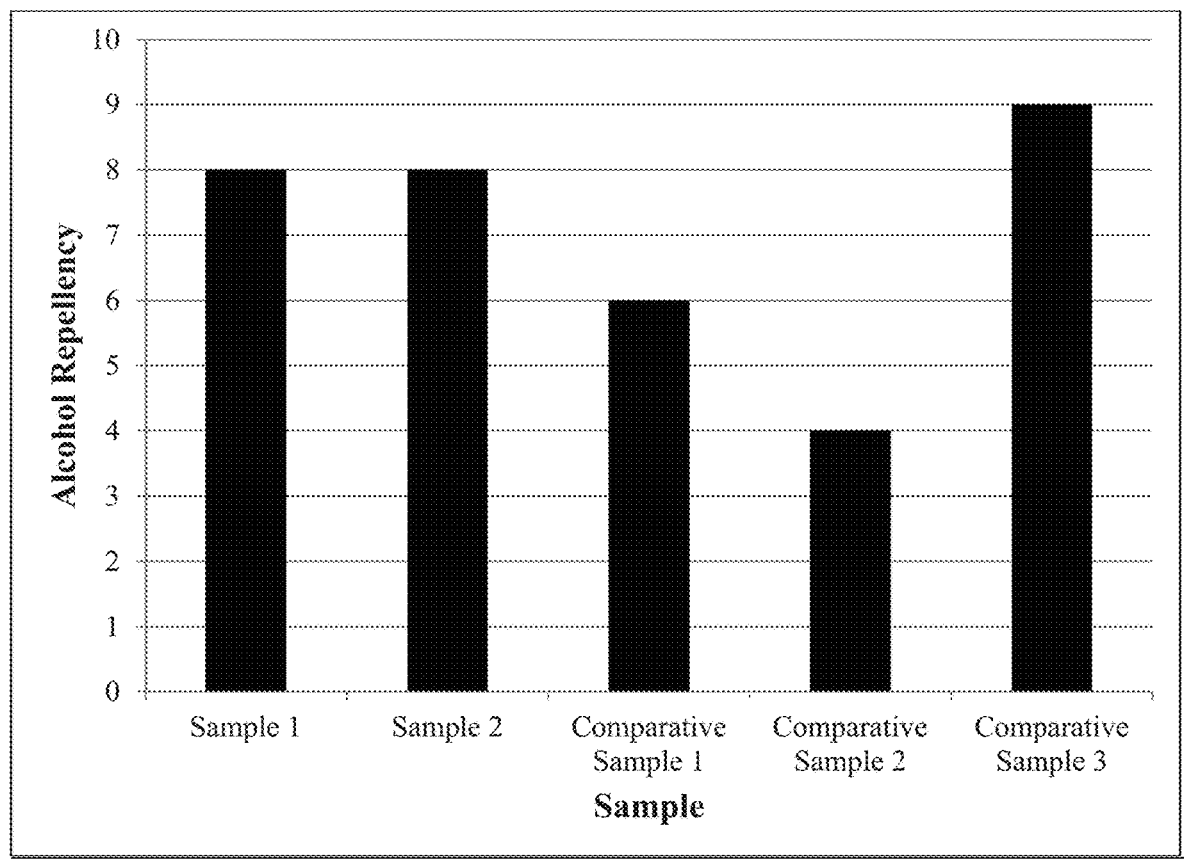
FIG. 4 illustrates the improved alcohol repellency achieved by fabrics treated with the alcohol repellent composition according to embodiments of the invention over other fabrics.

In accordance with certain embodiments of the invention, the alcohol repellent fabric may have an alcohol repellency rating of at least 5, or at least 6, or at least 7, as measured by the harmonized test method WSP 80.8. In other embodiments of the invention, for instance, the alcohol repellent fabric may have an alcohol repellency rating of at least 8, as measured by the harmonized test method WSP 80.8. In further embodiments of the invention, for example, the alcohol repellent fabric may have an alcohol repellency rating of at least 9, as measured by the harmonized test method WSP 80.8. As discussed in more detail below, FIG. 4 illustrates an improved alcohol repellency rating achieved by fabric that has been treated with an alcohol repellent composition according to an embodiment of the invention over other fabrics. As shown in FIG. 4, fabric treated with fluorochemical in the absence of binder achieves a higher alcohol repellency rating than other fabrics, but a fabric treated with fluorochemical and a binder (i.e., Sample 1 in FIG. 4) achieves an acceptable alcohol repellency rating for medical barrier fabrics along with other beneficial features such as increased hydrohead and decreased static decay, which are not realized by other fabrics treated with fluorochemicals in the absence of binder (e.g., Comparative Sample 3). Details regarding FIG. 4 and the data presented therein are discussed in greater detail in the "Examples" section of the present specification. Surprisingly, therefore, the combination of the fluorochemical and the binder in the ARC may contribute to improved alcohol repellency for a treated (e.g., coated, impregnated, etc.) fabric.

Figure 5:
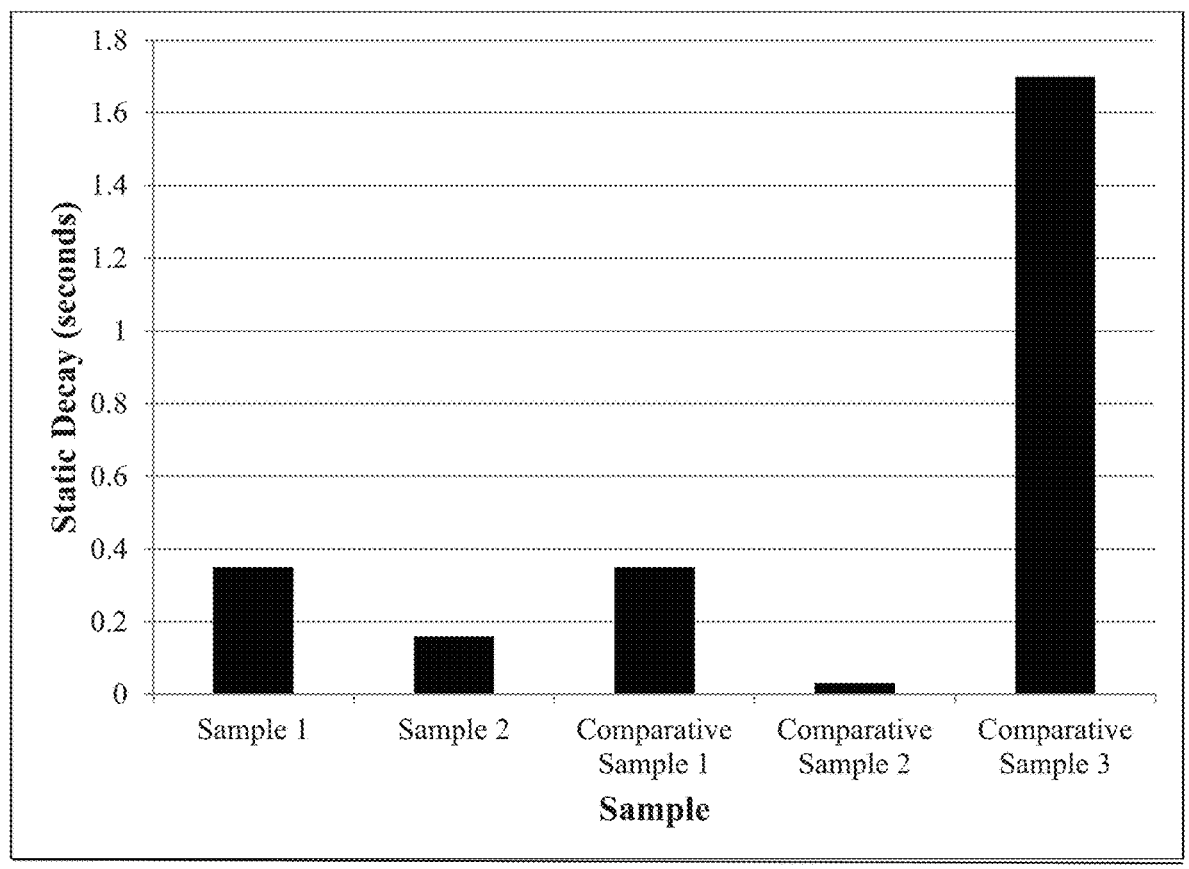
FIG. 5 illustrates the improved static decay achieved by fabrics treated with the alcohol repellent composition according to embodiments of the invention over other fabrics.

According to certain embodiments of the invention, for instance, the alcohol repellent fabric may have a static decay from about 0.01 seconds to about 0.5 seconds, as measured by standard test method NFPA 99 performed at 50% R.H. using 10% remaining charge as the cut-off level (Condition TC1). In other embodiments of the invention, for example, the alcohol repellent fabric may have a static decay from about 0.1 seconds to about 0.45 seconds. In further embodiments of the invention, for instance, the alcohol repellent fabric may have a static decay from about 0.125 seconds to about 0.4 seconds. As such, in certain embodiments of the invention, the alcohol repellent fabric may have a static decay from at least about any of the following: 0.01, 0.05, 0.1, 0.125, 0.2, and 0.3 seconds and/or at most about 0.5, 0.47, 0.45, 0.42, and 0.4 seconds (e.g., about 0.05-0.45 seconds, about 0.125-0.42 seconds, etc.) according to standard test method NFPA 99 performed at 50% R.H. using 10% remaining charge as the cut-off level. For instance, FIG. 5 illustrates the improved static decay achieved by fabric treated with an alcohol repellent composition according to an embodiment of the invention (i.e., Sample 1) over other fabrics. Details regarding FIG. 5 and the data presented therein are discussed in greater detail in the "Examples" section of the present specification. Accordingly, the combination of fluorochemicals and binder may contribute to improved static decay in addition to improved alcohol repellency.

Figure 3:
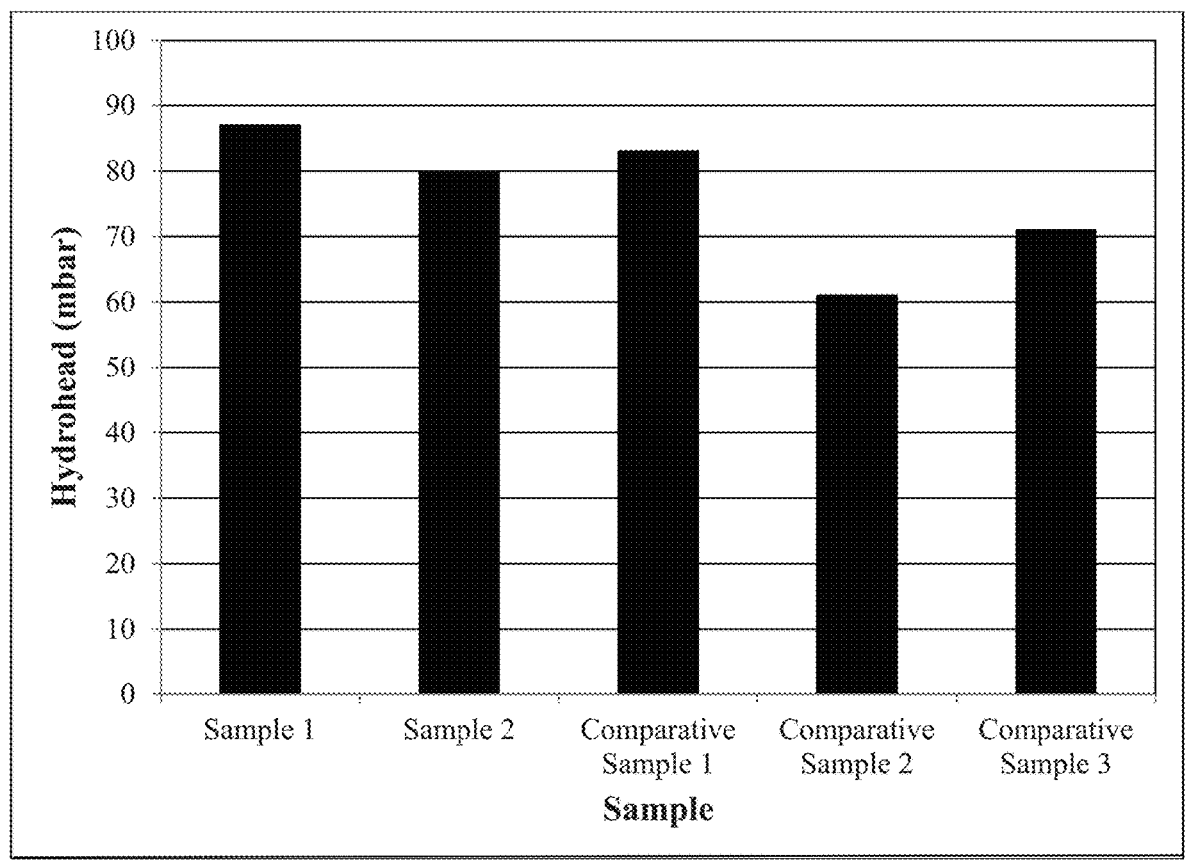
FIG. 3 illustrates the improved hydrohead rating achieved by fabrics treated with the alcohol repellent composition according to embodiments of the invention over other fabrics.

According to certain embodiments of the invention, for example, the alcohol repellent fabric may have a hydrohead from about 75 mbar to about 100 mbar, as measured by standard test method EN 20811 and ramping up the pressure at a rate of 60 mbar/min. In other embodiments of the invention, for instance, the alcohol repellent fabric may have a hydrohead from about 80 mbar to about 95 mbar (e.g., about 80 mbar to about 90 mbar). In other embodiments of the invention, the alcohol repellent fabric may have a hydrohead from about 83 mbar to about 90 mbar. As such, in certain embodiments of the invention, the alcohol repellent fabric may have a hydrohead from at least about any of the following: 75, 78, 80, 82, and 85 mbar and/or at most about 100, 97, 95, 92, and 90 mbar (e.g., about 80-90 mbar, about 78-92 mbar, etc.) according to standard test method EN 20811 and ramping up the pressure at a rate of 60 mbar/min. For instance, FIG. 3 illustrates the improved hydrohead achieved by fabric treated with an alcohol repellent composition according to an embodiment of the invention (i.e., Sample 1) over other fabrics. Accordingly, the combination of fluorochemical and binder may also simultaneously contribute to improved hydrohead. According to certain embodiments of the invention, for instance, the alcohol repellent fabric may have a bonding pattern on a surface, and the bonding pattern may comprise from about 5-25% of the alcohol repellent fabric surface. In other embodiments of the invention, for example, the bonding pattern may comprise from about 10-20% of the alcohol repellent fabric surface. In further embodiments of the invention, for instance, the bonding pattern may comprise from about 16-18% of the alcohol repellent fabric surface. As such, in certain embodiments of the invention, the bonding pattern may comprise from at least about any of the following: 5, 7, 10, 13, and 16% and/or at most about 25, 22, 20, 19, and 18% (e.g., about 10-25%, about 13-19%, etc.).

In accordance with certain embodiments of the invention, for example, the dried alcohol repellent fabric (e.g., fabric allowed to dry naturally or subjected to an active drying operation) may have a weight ratio of fluorochemical to binder from about 0.5-10:1 (e.g., 0.5-2.5:1, as measured on a dry basis. In other embodiments of the invention, for instance, the dried alcohol repellent fabric may have a weight ratio of fluorochemical to binder from about 0.5-2.9:1, as measured on a dry basis. In further embodiments of the invention, for example, the dried alcohol repellent fabric may have a weight ratio of fluorochemical to binder from about 0.75-2.5:1, as measured on a dry basis. In accordance with certain embodiments of the invention, the ARC and/or alcohol repellent fabric may comprise a weight ratio of fluorochemical to binder, as measured on a dry basis, from at least any of the following: 0.2:1, 0.25:1, 0.3:1, 0.4:1, 0.5:1, 0.6:1, 0.7:1, and 0.75:1 and/or at most about any of the following 10:1, 8:1, 6:1, 4:1, 3:1, 2:1, and 1:1 (e.g., 0.2-10:1, 0.5-3:1. 0.75-2:1, etc.).

In accordance with certain embodiments of the invention, the ARC may be provided and topically applied to the fibrous substrate in a liquid form as discussed throughout the present specification. The application of the ARC in liquid form may comprise applying the ARC to one or both sides of the fabric, or submerging the fabric in a bath of the ARC. In this regard, the ARC may permeate throughout substantially the entire thickness of the fabric to provide a wet ARC-impregnated fabric. In certain embodiments of the invention, the ARC may be applied to the fabric in a manner such that the ARC permeates through substantially the entire thickness (e.g., 95 to 100% of the thickness) of the fabric. In certain other embodiments of the invention, the ARC may be applied to the fabric in a manner such that the ARC does not permeate through the entire thickness of the fabric. In such embodiments of the invention, for example, the ARC may reside or extend within only about 90%, 80%, 70%, 60%, 50%, 40%, 30%, 25%, 20%, 15%, or 10% of the thickness of the fabric. In certain embodiments of the invention, the percentage of residence or extension of the thickness of the fabric may be located contiguously in one portion of the fabric or located as two generally separate locations separated, for example, by a middle portion of fabric devoid of ARC. In still further embodiments of the invention, the ARC may be present only substantially on the outward facing surface(s) of the fabric. In such embodiments of the invention, the ARC may reside or extend into the fabric by no more that about 5%, 3%, 2%, or 1% of the thickness of the fabric and the percentage of residence or extension of the thickness of the fabric may be located contiguously in one portion of the fabric or located as two generally separate locations separated, for example, by a large middle portion of fabric devoid of ARC. The topically applied ARC, in certain embodiments of the invention, may be allowed to naturally dry or subjected to an active drying step in which a majority or substantially all solvent (e.g., water and/or other solvents) are evaporated to provide a dried coating of the ARC covering (e.g., surrounding, encapsulating, etc.) at least a portion of the fibers of the fibrous substrate (e.g., fabric). In certain embodiments, the dry coating of the ARC may reside or extend into any percentage of thickness and in any configuration as previously described regarding the location of the ARC in liquid form due to the topical application of the liquid ARC to the fabric.

According to certain embodiments of the invention, for instance, the dried alcohol repellent fabric may comprise an ARC comprising about 0.065-0.6 wt % fluorochemical and about 0.024-0.4 wt % binder, each on a dry basis. In other embodiments of the invention, for example, the dried alcohol repellent fabric may comprise an ARC comprising about 0.08-0.45 wt % fluorochemical and about 0.04-0.3 wt % binder, each on a dry basis. In further embodiments of the invention, for instance, the dried alcohol repellent fabric may comprise an ARC comprising about 0.1-0.35 wt % fluorochemical and about 0.05-0.2 wt % binder, each on a dry basis. As such, in certain embodiments of the invention, the dried alcohol repellent fabric may comprise an ARC comprising at least one fluorochemical at a weight percentage on a dry basis from at least about any of the following: 0.065, 0.1, 0.13, 0.14, 0.15, and 0.16 wt % and/or at most about 0.6, 0.5, 0.45, 0.4, and 0.35 wt % (e.g., about 0.1-0.6 wt %, about 0.065-0.4 wt %, etc.). In further embodiments of the invention, the dried alcohol repellent fabric may comprise an ARC comprising at least one binder at a weight percentage on a dry basis from at least about any of the following: 0.02, 0.04, 0.05, 0.07, 0.1, and 0.2 wt % and/or at most about 0.4, 0.35, 0.3, 0.25, and 0.2 wt % (e.g., about 0.05-0.25 wt %, 0.1-0.3 wt %, etc.). In certain embodiments of the invention, for example, the dried alcohol repellent fabric may comprise an ARC comprising from about 0.025-0.275 wt % antistatic agent and from about 0.007-0.6 wt % surfactant, each on a dry basis. In other embodiments of the invention, for instance, the dried alcohol repellent fabric may comprise an ARC comprising from about 0.06-0.2 wt % antistatic agent and 0.02-0.5 wt % surfactant, each on a dry basis. In further embodiments of the invention, for example, the dried alcohol repellent fabric may comprise an ARC comprising from about 0.15-0.25 wt % antistatic agent and 0.05-0.4 wt % surfactant, each on a dry basis. As such, according to certain embodiments of the invention, the dried alcohol repellent fabric may comprise an ARC comprising at least one antistatic agent at a weight percentage on a dry basis from at least about any of the following: 0.02, 0.025, 0.03, 0.04, 0.06, 0.1, and 0.15 wt % and/or at most about 0.275, 0.25, 0.225, 0.2, and 0.18 wt % (e.g., about 0.06-0.25 wt %, about 0.1-0.275 wt %, etc.). In further embodiments of the invention, the dried alcohol repellent fabric may comprise an ARC comprising at least one surfactant at a weight percentage on a dry basis from at least about any of the following: 0.007, 0.01, 0.014, 0.025, and 0.05 wt % and/or at most about 0.6, 0.55, 0.5, 0.45, and 0.4 wt % (e.g., about 0.025-0.5 wt %, about 0.007-0.7 wt %, etc.).

In accordance with certain embodiments of the invention, the alcohol repellent fabric comprises a reduced fluorochemical content per given unit of fibrous substrate than typical barrier fabrics, such as alcohol repellent fabrics meeting industry requirements for use in surgical drape and surgical gown applications as discussed throughout the present specification. In this regard, certain embodiments of the invention include an alcohol repellent fabric comprising a fluorochemical comprising from about 0.1 wt %, as measured on a dry basis, to about 2 wt %, as measured on a dry basis, based on the total weight of the alcohol repellent fabric on a dry basis (e.g., the weight of the fibrous substrate plus the weight of any materials added thereto determined on a dry basis). For example, certain embodiments of the invention include an alcohol repellent fabric comprising a fluorochemical content comprising from about at least about any of the following: 0.05, 0.1, 0.2, 0.3, 0.4, and 0.5 wt %, as measured on a dry basis based on the total weight of the alcohol repellent fabric on a dry basis and/or at most about 2, 1.75, 1.5, 1.25, 1.0, 0.9, 0.8, 0.7, and 0.6 wt %, as measured on a dry basis based on the total weight of the alcohol repellent fabric on a dry basis (e.g., about 0.05-2 wt %, about 0.1-0.6 wt %, etc.).

In certain embodiments of the invention, the alcohol repellent fabric comprises a binder comprising from about 0.01 wt %, as measured on a dry basis, to about 1.5 wt %, as measured on a dry basis, based on the total weight of the alcohol repellent fabric on a dry basis (e.g., the weight of the fibrous substrate plus the weight of any materials added thereto determined on a dry basis). For example, certain embodiments of the invention include an alcohol repellent fabric comprising a binder content comprising from about at least about any of the following: 0.01, 0.02, 0.03, 0.05, 0.075, 0.1, 0.15, 0.2, 0.25, and 0.3 wt %, as measured on a dry basis based on the total weight of the alcohol repellent fabric on a dry basis and/or at most about 1.5, 1.25, 1.0, 0.75, 0.5, and 0.4 wt %, as measured on a dry basis based on the total weight of the alcohol repellent fabric on a dry basis (e.g., about 0.05-0.3 wt %, about 0.02-0.4 wt %, etc.).

III. FIBROUS SUBSTRATE

A. Nonwoven

In accordance with certain embodiments of the invention, the fibrous substrate may comprise at least one nonwoven. In some embodiments of the invention, for example, the at least one nonwoven may comprise at least one layer of staple fibers. In other embodiments of the invention, for instance, the at least one nonwoven may comprise at least one layer of continuous filaments (e.g., spunbond). In further embodiments of the invention, for example, the at least one nonwoven may comprise at least one layer of fine fibers. In such embodiments of the invention, for instance, the at least one layer of fine fibers may comprise at least one of meltblown fibers, melt film fibrillation fibers, sub-micron nonwoven fibers, or any combination thereof. As such, according to certain embodiments of the invention, for instance, the at least one nonwoven may be SMS, SMMS, SSMMS, SMMMS and/or the like, where S=spunbond and M=meltblown.

FIG. 1, for example, illustrates a cross sectional view of an alcohol repellent fabric according to an embodiment of the invention. As shown in FIG. 1 and discussed above, the alcohol repellent fabric 100 includes a fibrous substrate 104 and an ARC 102 disposed over the outer surface of the fibrous substrate 104. The fibrous substrate 104 includes a first continuous filament layer 106a, a second continuous filament layer 106b, and three meltblown layers 108a, 108b, 108c positioned between the first continuous filament layer 106a and the second continuous filament layer 106b.

According to certain embodiments of the invention, for example, the at least one nonwoven may comprise a first continuous filament layer, a second continuous filament layer, and at least two fine fiber layers adjacent to the first continuous filament layer and the second continuous filament layer. In such embodiments of the invention, for instance, the at least two fine fiber layers may have a combined basis weight from about 1 gsm to about 30 gsm (e.g., about 5 gsm to about 30 gsm). In other embodiments of the invention, for example, the at least two fine fiber layers may have a combined basis weight from about 10 gsm to about 20 gsm. In further embodiments of the invention, for instance, the at least two fine fiber layers may have a combined basis weight from about 12 gsm to about 15 gsm. As such, in certain embodiments of the invention, the at least two fine fiber layers may have a combined basis weight from at least about any of the following: 5, 8, 10, 11, and 12 gsm and/or at most about 30, 25, 20, 18, and 15 gsm (e.g., about 10-15 gsm, about 12-30 gsm, etc.). Additionally, in some embodiments of the invention, for example, each of the first continuous filament layer and the second continuous filament layer may have a basis weight from about 10 gsm to about 50 gsm. In other embodiments of the invention, for instance, each of the first continuous filament layer and the second continuous filament layer may have a basis weight from about 15 gsm to about 30 gsm. In further embodiments of the invention, for example, each of the first continuous filament layer and the second continuous filament layer may have a basis weight from about 20 gsm to about 25 gsm. As such, in certain embodiments of the invention, each of the first continuous filament layer and the second continuous filament layer may have a basis weight from at least about any of the following: 10, 12, 15, 18, and 20 gsm and/or at most about 50, 40, 30, 28, and 25 gsm (e.g., about 15-30 gsm, about 20-50 gsm, etc.).

According to certain embodiments of the invention, for instance, the at least one nonwoven may comprise a wood pulp layer and a synthetic fiber layer such that the wood pulp layer and the synthetic fiber layer are hydroentangled together. In some embodiments of the invention, for example, the at least one nonwoven may comprise bicomponent fibers. In certain embodiments of the invention, for example, the at least one nonwoven may comprise at least one of a polyolefin, a polyester, a polyamide, a natural fiber, a cellulosic fiber, or any combination thereof. In some embodiments of the invention, for instance, the at least one nonwoven may comprise at least one of a polypropylene, a polyethylene, a polyester, a polyamide, cotton, rayon, a wood fiber, or any combination thereof. In further embodiments of the invention, for instance, the at least one nonwoven may comprise a polyolefin thermoplastic polymer. In certain embodiments of the invention, for example, the at least one nonwoven may comprise a polypropylene. In further embodiments of the invention, for instance, the at least one nonwoven may comprise a polyethylene. In such embodiments of the invention, for example, the at least one nonwoven may comprise bicomponent polyethylene fibers and filaments and/or flash spun polyethylene (e.g., TYVEK®).

According to certain embodiments of the invention, for instance, individual layers of fibrous substrate may be bonded together. Fibrous substrates used in the alcohol repellent fabric of the invention may become bonded by any technique known in the art. Exemplary, but non-limiting, techniques that may be used to bond the nonwoven webs include thermal bonding, latex bonding, solvent bonding, mechanical bonding, ultrasonic bonding, needlepunching, spunlacing, stitchbonding, and any combination thereof.

Thermal bonding, for example, comprises fusing fiber surfaces to one another throughout the nonwoven web. For example, a non-limiting technique for thermal bonding nonwoven webs involves fusing the fibers by softening the fiber surface. Alternative embodiments comprise including and then melting fusible additives in the form of fibers, powders or particulates throughout the nonwoven web. Non-limiting examples of thermal bonding techniques, according to certain embodiments of the invention, include calendering and through-air heating/bonding. Calendering involves drawing the nonwoven web between heated cylinders that have an embossed pattern allowing only part of the web to become exposed to heat and pressure supplied by the cylinder. Through-air thermal bonding uses hot air to fuse the fibers at the surface of the web as well as internally within the web. Hot air can either be blown through the web in a conveyorized oven or sucked through the web as it passes over a porous drum as a vacuum is developed.

Latex bonding involves the use of an adhesive resin or a binder that is applied to the web typically by any one of dipping the web into the binder, for example, through full or partial saturation bonding, and removing any excess or disposing the binder onto and/or throughout the web by spraying, foaming, and/or printing techniques. Solvent bonding may be used as a bonding technique when the materials of the fibers of the nonwoven web are susceptible to dissolution by the applied solvent.

Mechanical bonding, according to certain embodiments of the invention, enmeshes and/or entangles fibers to impart strength to the web. The extent of bonding in nonwoven webs that have been bonded using mechanical bonding depends upon the type of mechanical bonding technique which is used where non-limiting examples include hydroentanglement, needlepunching, and stitchbonding.

Ultrasonic bonding is similar to thermal bonding in many respects, and the extent of bonding in nonwoven webs that have been ultrasonically bonded may be representative by the same corresponding factors for a nonwoven web that has been thermally bonded. An ultrasonic bonded web is drawn between a "horn," which produces high frequency sound waves, and a rotary calender, which is referred to as the "anvil." The sound energy, which corresponds to the thermal energy in thermal bonding, generates localized heat through mechanical vibration at the embossing points on the calender where the nonwoven web becomes fused.

B. Woven

In other embodiments of the invention, for instance, the fibrous substrate may comprise at least one woven layer. In such embodiments of the invention, for example, the woven layer may have a structure of individual fibers, filaments, and/or threads that are interlaid in an identifiable repeating manner. In accordance with certain embodiments of the invention, for instance, the fibrous substrate may comprise nonwoven layers and woven layers.

C. Laminate

In accordance with certain embodiments of the invention, the fibrous substrate may comprise a laminate. For example, the laminate may comprise any combination of various nonwoven layers as discussed above (e.g., SMS, SMMS, SSMMS, SMMMS, etc.), woven layers, and/or film layers. Formation of laminate-style fibrous structure, in accordance with certain embodiments of the invention, are is not particularly limited and can be achieved by any method known in the art (e.g., adhesively bonding the film to a nonwoven or woven layer, etc.) In accordance with certain embodiments of the invention, the film may comprise a single layer or a multi-layer film. Multi-layer films, for example, may comprise a central core layer sandwiched between two outer film layers, such as skin layers having a notably smaller thickness than the core layer. In certain embodiments of the invention, the film included in the laminate-style fibrous structure may be formed from (i) one or more highly breathable polymers and/or elastomers alone; (ii) one or more non-breathable materials (e.g., polymers or elastomers), or any combinations thereof.

In certain embodiments of the invention the laminate may comprise a film layer comprising a microporous film. The microporous film may include a polymer and/or elastomer matrix, a plurality of voids within the matrix surrounded by relatively thin microporous membranes defining tortuous paths, and one or more filler particles in each void. In such embodiments of the invention, for example, the film may comprise a breathable film in which the microporous membranes between the voids readily permit molecular diffusion of water vapor from a first surface to a second surface of the film. Alternatively, some or all of the micropores can pass through the film, or can be interconnected to provide through-passages for vapors. In certain exemplary embodiments of the invention, the laminate may comprise a microporous film comprising a polypropylene and at least one filler, such as calcium carbonate. In such embodiments of the invention, the polymer content of the film may comprise from about 50 wt % to about 100 wt % of a polypropylene.

In accordance with certain embodiments, a film layer including filler therein may be independently stretched or oriented alone or after being joined to the other layers of the laminate-style fibrous substrate. For instance, the polymer composition, filler content, filler particle size and/or degree of stretching may be varied to help achieve a desired level of breathability and liquid barrier properties of the microporous film in the laminate. Generally, the oriented microporous film may be less than about 50 microns thick, or less than about 30 microns thick, or less than about 20 microns thick. The film, according to certain embodiments, may be uniaxially stretched to about 1.1-7.0 (e.g., 1.5-6, 2.5-5.0, etc.) times its original length to cause or facilitate breathability. The film may alternatively be biaxially stretched using conventional techniques familiar to persons skilled in the art. In certain embodiments, however, the film may be uniaxially stretched in its machine direction, and then laminated to the other layers (e.g., nonwoven layer(s)) with the machine direction of the film aligned with the machine direction of the other layers (e.g., nonwoven layer(s)). Stretching temperatures may range from about 38-150° C. (e.g., 70-95° C.) depending on the specific materials (e.g., polymers) employed. In this regard, the stretched or oriented films may comprise breathable extendible films suitable for a variety of applications.

Certain embodiments according to the invention may comprise a laminate-style fibrous substrate including a monolithic film comprising at least one highly breathable polymer. In accordance with certain embodiments, the film may comprise a multi-layer film including a monolithic film layer and at least one microporous layer.

In certain alternative embodiments, the fibrous substrate may comprise a film as described herein alone. For instance, the fibrous substrate may include only a film layer(s).

IV. ALCOHOL REPELLENT COMPOSITION (ARC)

In yet another aspect, certain embodiments of the invention provide an alcohol repellent composition (ARC). The ARC includes at least one fluorochemical and at least one binder.

In accordance with certain embodiments of the invention, for example, the ARC may comprise an emulsion, a solution, a suspension, or a colloid. In some embodiments of the invention, for instance, the ARC may comprise an emulsion or a solution. In certain embodiments of the invention, for example, the ARC may be topically applied to the fibrous substrate via at least one of padding, spraying, printing, foaming, or any combination thereof. The ARC may be applied to the fibrous substrate in a liquid form (e.g., emulsion, solution, suspension, colloid, etc.), and either allowed to dry naturally or subjected to an active drying operation/step to provide a dried coating of the ARC. In this regard, the ARC may comprise a dry coating.

In accordance with certain embodiments of the invention, for instance, the ARC may comprise about 0.065-0.6 wt % fluorochemical and about 0.02-0.4 wt % binder, each on a dry basis. In other embodiments of the invention, for example, the ARC may comprise about 0.08-0.45 wt % fluorochemical and about 0.040-0.3 wt % binder, each on a dry basis. In further embodiments of the invention, for instance, the ARC may comprise about 0.1-0.35 wt % fluorochemical and about 0.05-0.2 wt % binder, each on a dry basis. As such, in certain embodiments of the invention, the ARC may comprise at least one fluorochemical at a weight percentage on a dry basis from at least about any of the following: 0.065, 0.1, 0.13, 0.14, and 0.156 wt % and/or at most about 0.6, 0.5, 0.42, 0.4, and 0.36 wt % (e.g., about 0.13-0.6 wt %, about 0.065-0.4 wt %, etc.). In further embodiments of the invention, the ARC may comprise at least one binder at a weight percentage on a dry basis from at least about any of the following: 0.02, 0.04, 0.05, 0.07, 0.1, and 0.2 wt % and/or at most about 0.4, 0.35, 0.3, 0.25, and 0.2 wt % (e.g., about 0.05-0.25 wt %, 0.1-0.3 wt %, etc.). In certain embodiments of the invention, for example, the ARC may comprise from about 0.025-0.275 wt % antistatic agent and from about 0.007-0.6 wt % surfactant, each on a dry basis. In other embodiments of the invention, for instance, the ARC may comprise from about 0.06-0.2 wt % antistatic agent and 0.02-0.5 wt % surfactant, each on a dry basis. In further embodiments of the invention, for example, the ARC may comprise from about 0.15-0.25 wt % antistatic agent and 0.05-0.4 wt % surfactant, each on a dry basis. As such, according to certain embodiments of the invention, the ARC may comprise at least one antistatic agent at a weight percentage on a dry basis from at least about any of the following: 0.025, 0.04, 0.06, 0.08, 0.1, and 0.15 wt % and/or at most about 0.275, 0.25, 0.2, and 0.18 wt % (e.g., about 0.06-0.25 wt %, about 0.1-0.275 wt %, etc.). In further embodiments of the invention, the ARC may comprise at least one surfactant at a weight percentage on a dry basis from at least about any of the following: 0.007, 0.01, 0.014, 0.025, and 0.05 wt % and/or at most about 0.6, 0.55, 0.5, 0.45, and 0.4 wt % (e.g., about 0.025-0.5 wt %, about 0.007-0.7 wt %, etc.)

A. Fluorochemical

Fluorochemicals (e.g., fluorocarbons) provide fiber surfaces with low surface energy. Fluorochemicals may provide alcohol repellent properties to fabrics, in accordance with certain embodiments of the invention. In accordance with certain embodiments of the invention, the fluorochemicals may comprise a reactive functionality (e.g., a reactive group) and a perfluorocarbon side chain (e.g., a fluorocarbon in which the hydrogen atoms directly attached to the carbon atoms have been completely replaced with fluorine atoms). In such embodiments of the invention, the reactive functionality of the fluorochemicals may include, for example, an acrylate (e.g., methacrylate group). The fluorochemicals may form a polymer via reaction between the reactive functionalities, such as methacrylate groups, of the fluorochemicals. The resulting polymer according to certain embodiments of the invention may comprise an aliphatic backbone (e.g., a straight or branched chain of carbon atoms, which may be saturated or unsaturated) and a plurality of perfluorocarbon side chains directly or indirectly attached to the aliphatic backbone. In accordance with certain embodiments, the perfluorocarbon side chains may comprise straight and/or branched side chains. This polymerization causes a film to form on the surfaces of fibers in the fabric, and at least partially encases a portion of the fibers to facilitate alcohol repellency. In this regard, fluorochemicals may be provided in any particular form (e.g., emulsion, dispersion, solution, etc.) and after a drying step (e.g., active or passive) the formed film may comprise a dry coating that at least partially surrounds or encases a portion of one or more fibers of a fibrous substrate. In accordance with certain embodiments of the invention, for example, a majority of fibers disposed on an outer surface (or surfaces) of the fibrous substrate may be substantially entirely encased by an ARC-based dry coating.

For surgical drape and gown applications, for instance, C4-C10 fluorochemicals (e.g., C6 fluorochemicals) may be used, in which the nomenclature of "C4-C10" references the number of carbon atoms of the perfluorocarbon side chains. In accordance with certain embodiments of the invention, the fluorochemicals in the ARC may comprise a mixture of fluorochemicals having a variety of different perfluorocarbon side chains (e.g., any mixture of C4, C6, C8, and/or C10 fluorochemicals). By way of example only, an exemplary C6 fluorochemical acrylic copolymer is illustrated by Formula I in which the C6 perfluorocarbon side chain is circled for ease of identification in one of the side chains:

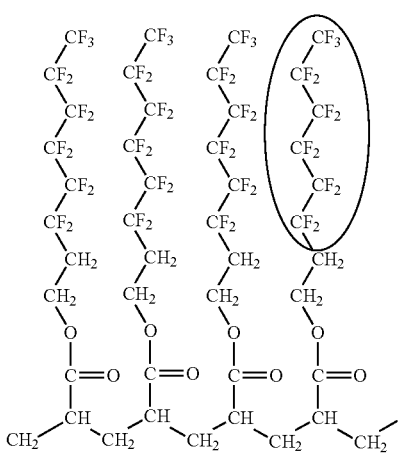

(I)

Although the foregoing discussion references acrylate functionality as the reactive functionality for the fluorochemicals, it should be noted that such discussion is merely illustrative and non-limiting. In certain embodiments of the invention, for example, the reactive functionality of the fluorochemicals is not limited to an acrylate functional group, as a variety of reactive functionalities may be employed to provide an aliphatic backbone upon which the plurality of perfluorocarbon side chains are attached. In accordance with certain further embodiments of the invention, the fluorochemicals may comprise at least one heteroatom (e.g., nitrogen atom, sulfur atom, oxygen atom, etc.) within the carbon chain forming the side chain and/or within the reactive group that forms the backbone from which the plurality of perfluorocarbon side chains directly or indirectly extend.

In accordance with certain embodiments of the invention, for example, the at least one fluorochemical may comprise at least one of a C4-C10 fluorochemical. In some embodiments of the invention, for instance, the at least one fluorochemical may comprise at least one of a C4 fluorochemical, a C5 fluorochemical, a C6 fluorochemical, a C7 fluorochemical, a C8 fluorochemical, a C9 fluorochemical, a C10 fluorochemical, or any combination thereof. In further embodiments of the invention, for example, the at least one fluorochemical may comprise a C6 fluorochemical. In certain embodiments of the invention, for instance, the at least one fluorochemical may comprise a perfluoroalkylethylmethacrylate, perfluoroalkylpropylmethacrylate, or combinations thereof.

Additional non-limiting examples of fluorochemicals, according to certain embodiments of the present invention include the following:

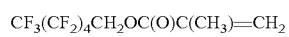

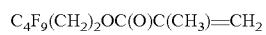

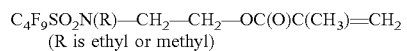
(R is ethyl or methyl)

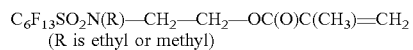
(R is ethyl or methyl)

In accordance with certain embodiments of the invention, the fluorochemicals are devoid of sulfur and/or nitrogen atoms.

B. Binder

Binders, according to certain embodiments of the invention, may improve the alcohol repellent properties of the fluorochemical. As such, less fluorochemical may be needed in order to achieve the necessary and/or desired level of alcohol repellency for a fabric. The addition of binders may also improve antistatic properties of the fabric, thereby reducing the amount of antistatic agent required to maintain appropriate antistatic properties.

In accordance with certain embodiments of the invention, for example, the at least one binder may comprise at least one of an acrylic binder, a styrene-butadiene rubber binder, a vinyl copolymer binder, a vinyl acetate binder, an ethylene vinyl acetate binder, a polyvinyl chloride binder, a polyurethane binder, or any combination thereof. In some embodiments of the invention, for instance, the at least one binder may comprise an acrylic binder. In accordance with certain embodiments of the invention, the acrylic binder may comprise a thermoplastic polymer or copolymers of acrylic acid, methacrylic acid, esters of these acids, and/or acrylonitrile. In certain embodiments of the invention, acrylic binders may include a variety of acrylic homopolymers, acrylic copolymers (e.g., block copolymers, alternating copolymers, and random copolymers), and styrene-acrylic polymers. In further embodiments of the invention, for example, the acrylic binder may comprise an anionic acrylic binder, a cationic acrylic binder, or a non-ionic acrylic binder. In certain embodiments of the invention, for instance, the acrylic binder may comprise a non-ionic acrylic binder. In some embodiments of the invention, for example, the non-ionic acrylic binder may comprise a self cross-linking non-ionic acrylic binder. An exemplary self cross-linking non-ionic acrylic binder suitable for certain embodiments of the present invention includes Conpad Binder 2000 FR, which is commercially available from Consulmag Corp. (USA).

C. Antistatic Agent

Dissipation of static electricity is typically needed in particular applications (e.g., surgical drapes and gowns). The marked tendency of thermoplastic polymers (e.g., polypropylene, polyethylene, etc.) to accumulate static charges may result in adherence of particles of dust and other undesirable foreign matter. Additionally, without charge dissipation, fabrics used in these (or similar) applications may stick to the body of a user and gradually creep up with user movement. As such, fabrics used in these or similar applications may include antistatic agents to prevent the build-up of charges that may affect the ability of the fabric to drape naturally and stay in place. In such applications, antistatic agents may be selected so as to maintain the stability of the other elements in the ARC.

In accordance with certain embodiments of the invention, for instance, the ARC may further comprise at least one antistatic agent. In such embodiments of the invention, for example, the at least one antistatic agent may comprise at least one of a non-ionic antistatic agent, an anionic antistatic agent, a cationic antistatic agent, an amphoteric antistatic agent, or any combination thereof. In some embodiments of the invention, for instance, the at least one antistatic agent may comprise an anionic antistatic agent. In other embodiments of the invention, for example, the at least one antistatic agent may comprise a phosphate ester, a neutralized alcohol phosphate, a fatty quaternary ammonium compound or salt thereof (e.g., behentrimonium chloride or cocamidopropyl betaine), a fatty amine, a polyethylene glycol ester, and/or combinations thereof. In accordance with certain embodiments of the invention, the at least one antistatic agent may comprise aliphatic amines (optionally ethoxylated) and aliphatic amides. In further embodiments of the invention, for instance, the at least one antistatic agent may comprise an alkylphosphate. In certain preferred embodiments, the at least one antistatic agent comprises a phosphate ester, which is commercially available as Zelec® TY from Stepan Company (IL, USA).

D. Surfactant

Surfactants may help the ARC wet and penetrate the fibrous substrate. As such, in accordance with certain embodiments of the invention, for example, the ARC may further comprise at least one surfactant. In such embodiments of the invention, for instance, the at least one surfactant may have a surface tension of less than 30 dynes. In other embodiments of the invention, for example, the at least one surfactant may have a surface tension of less than 25 dynes. In further embodiments of the invention, for instance, the at least one surfactant may have a surface tension of less than 20 dynes. In accordance with certain embodiments of the invention, the at least one surfactant may comprise a non-ionic surfactant, cationic surfactant, anionic surfactant, and/or combinations thereof.

In certain embodiments of the invention, the at least one surfactant may comprise one or more polysorbates. Polysorbates are a class of non-ionic surfactants (e.g., a polyoxyethylene fatty acid ester) that are derived from PEGylated sorbitan (a derivative of sorbitol) esterified with fatty acids, such as stearic, lauric, oleic or palmitic fatty acids. Non-limiting examples of suitable polysorbates according to certain embodiments of the invention include Polysorbate 20 (polyoxyethylene (20) sorbitan monolaurate); Polysorbate 40 (polyoxyethylene (20) sorbitan monopalmitate); Polysorbate 60 (polyoxyethylene (20) sorbitan monostearate); and Polysorbate 80 (polyoxyethylene (20) sorbitan monooleate). Although the particular surfactant or surfactants are not particularly limited in accordance with certain embodiment of the invention, the at least one surfactant may comprise a polyoxyethylene sorbitan monooleate, such as Alkanol® 6112 commercially available from DuPont®.

E. Exemplary Embodiment

By way of example only, an exemplary (i.e., non-limiting) embodiment of the invention may comprise an alcohol repellent fabric comprising a polypropylene nonwoven topically treated with an ARC. In this particular example embodiment of the invention, for instance, the polypropylene nonwoven may comprise an SMS nonwoven in which at least one layer of polypropylene meltblown fibers is adjacent to at least two layers of polypropylene continuous filaments. In this exemplary embodiment of the invention, the ARC may comprise about 0.065-0.6 wt % fluorochemicals, about 0.02-0.35 wt % binder, about 0.025-0.275 wt % antistatic agent, and about 0.007-0.075 wt % surfactant, each on a dry basis. Accordingly, the ARC may comprise about 0.1-0.35 wt % fluorochemicals, about 0.05-0.2 wt % binder, 0.15-0.25 wt % antistatic agent and 0.04-0.08 wt % surfactant, each on a dry basis.

V. PROCESS FOR FORMING A TOPICALLY TREATED ALCOHOL REPELLENT FABRIC

In another aspect, certain embodiments of the invention provide a process for forming a topically-treated, alcohol repellent fabric. The process includes providing a fibrous substrate and topically applying an alcohol repellent composition (ARC) to at least a portion of an outer surface of the fibrous substrate to form the alcohol repellent fabric. The ARC may comprise at least one fluorochemical and at least one binder. According to certain embodiments of the invention, for example, topically applying the ARC to the fibrous substrate may comprise at least one of padding, spraying, printing, foaming, or any combination thereof.

In accordance with certain embodiments of the invention, the ARC may be provided and topically applied to the fibrous substrate in a liquid form as previously discussed. The application of the ARC in liquid form may comprise applying the ARC to one or both sides of the fabric, or submerging the fabric in a bath of the ARC. In this regard, the ARC may permeate throughout substantially the entire thickness of the fabric to provide a wet ARC-impregnated fabric. In certain embodiments of the invention, the ARC may be applied to the fabric in a manner such that the ARC does not permeate through the entire thickness of the fabric. In such embodiments of the invention, for example, the ARC may reside or extend within only about 90%, 80%, 70%, 60%, 50%, 40%, 30%, 25%, 20%, 15%, or 10% of the thickness of the fabric. In certain embodiments of the invention, the percentage of residence or extension of the thickness of the fabric may be located contiguously in one portion of the fabric or located as two generally separate locations separated, for example, by a middle portion of fabric devoid of ARC. In still further embodiments of the invention, the ARC may be present only substantially on the outward facing surface(s) of the fabric. In such embodiments of the invention, the ARC may reside or extend into the fabric by no more that about 5%, 3%, 2%, or 1% of the thickness of the fabric and the percentage of residence or extension of the thickness of the fabric may be located contiguously in one portion of the fabric or located as two generally separate locations separated, for example, by a large middle portion of fabric devoid of ARC.

In accordance with certain embodiments of the invention, for instance, the process may further comprise removing excess solution from the fabric. Removing excess solution may be performed using any suitable method understood in the art, such as by squeezing excess ARC (in liquid form) out of the fabric via padded pinching rolls. In such embodiments of the invention, for example, the alcohol repellent fabric may have a wet content from about 30 wt % to about 100 wt % (e.g., about 60 wt %) prior to drying, which may be passive (e.g., allowing the fabric to dry naturally) or actively (e.g., subjecting the fabric to an industrial drying operation). In some embodiments of the invention, for example, the process may further comprise an active step of drying the alcohol repellent fabric. The drying step, for example, may comprise any suitable method (e.g., drying operation) known in the art. In some embodiments, for example, drying may occur via steam cans.

In certain embodiments of the invention, the ARC-treated fabric may be allowed to naturally dry or subjected to an actual drying operation to quickly provide a dried alcohol repellent fabric. As discussed above, the ARC may be impregnated throughout a variety of thicknesses of the fabric (e.g., mainly located on the surfaces or through substantially the entire thickness of the fabric). Upon drying, therefore, the ARC (applied in liquid form) is also dried to provide a dry coating of the ARC, which at least partially surrounds or encases at least a portion of the individual fibers of the fabric. In this regard, the dry coating of ARC may be found either predominantly located on fibers located at or proximate the outward surfaces of the fabric or located on fibers located throughout substantially the entire thickness of the fabric to provide a three-dimensional network or such an ARC dry coating. In accordance with certain embodiments of the invention, a majority of the individual fibers present at or proximate to the outer surface or surfaces of the fabric may be at least partially encased by the coating of the ARC (e.g., a dry coating of the ARC). The ARC coating (e.g., a dry coating of the ARC) may extend throughout substantially the entirety of the thickness of the fabric, or at least about 25% of the thickness of the fabric. In other embodiment of the invention, the ARC coating (e.g., a dry coating of the ARC) may extend throughout no more than about 25% of the thickness of the fabric. In certain embodiments, the dry coating of the ARC may reside or extend into any percentage of thickness and in any configuration as previously described regarding the location of the ARC in liquid form due to the topical application of the liquid ARC to the fabric.

Figure 2:
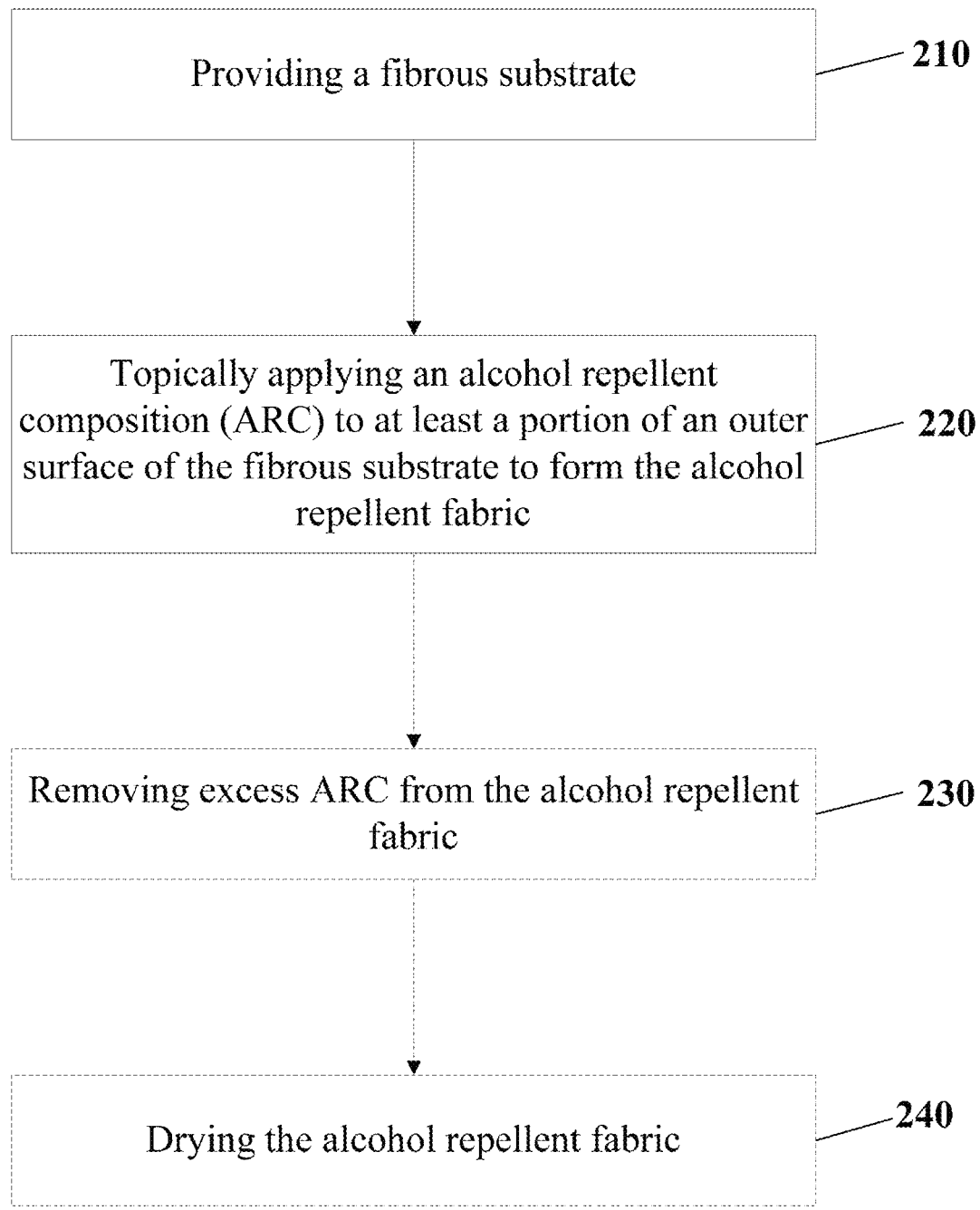
FIG. 2 illustrates a process flow diagram for forming an alcohol repellent fabric according to an embodiment of the invention showing an optional step of drying the alcohol repellent fabric.

FIG. 2, for example, illustrates a process flow diagram for forming an alcohol repellent fabric according to an embodiment of the invention showing an optional step of drying the alcohol repellent fabric. As shown in FIG. 2, the process includes providing a fibrous substrate at operation 210. The process further includes topically applying an ARC to at least a portion of an outer surface or allowing the ARC to impregnate or permeate throughout a desired thickness (e.g., substantially the entire thickness of the fibrous substrate) of the fibrous substrate to form the alcohol repellent fabric at operation 220. The process also includes optional steps of removing excess ARC from the alcohol repellent fabric at operation 230 and drying the alcohol repellent fabric to provide a dried alcohol repellent fabric at operation 240, for example, by steam cans. Thus, the invention includes, according to certain embodiments, a topically treated alcohol repellent fabric based, at least in part, on a fibrous substrate and an alcohol repellent composition (ARC). Alcohol repellent fabrics, according to certain embodiments of the invention, may exhibit at least the level of alcohol repellency necessary for surgical applications using, for example, from about 20% to about 50% (e.g., from about 30% to about 50%, from about 30% to about 45%) less than the amount of fluorochemical typically applied to such fabrics.

In accordance with certain embodiments, the alcohol repellant fabric may comprise a laminate-style fibrous substrate including at least one film as discussed previously. In this regard, the laminate-style fibrous structure may be topically treated with an ARC in a variety of ways. In certain embodiments of the invention, for example, the assembled laminate may have an ARC topically applied thereto as previously discussed. In addition or alternatively, the film of the laminate-style fibrous structure may be independently treated (e.g. topically coated) with an ARC prior to assembling the laminate. In certain embodiments, for example, the film may be independently coated with an ARC, laminated (e.g., joined or attached) to one or more nonwoven and/or woven layers to provide an assembled laminate-style fibrous substrate, and the assembled laminate-style fibrous substrate may also be treated with an ARC as previously discussed. Certain embodiment of the invention may comprise topically applying an ARC independently to the film and the nonwoven and/or woven layer(s) prior to assembling the laminate-style fibrous structure. In such embodiments, the assembled laminate-style fibrous structure may optionally be subsequently treated (e.g., topically treated) with an ARC.

Examples

The present disclosure is further illustrated by the following examples, which in no way should be construed as being limiting. That is, the specific features described in the following examples are merely illustrative and not limiting.

Test Methods

Basis weight of the following examples was measured in a way that is consistent with the ASTM test method D3776. The results were provided in units of mass per unit area in $g/m^2$ (gsm).

Alcohol repellency of the following examples was measured in a way that is consistent with the harmonized test method WSP 80.8.

Static decay of the following examples was measured in ways that are consistent with standard test method NFPA 99. In one case identified as TC1 the test conditions were set at 50% R.H. and used 10% remaining charge as the cut-off level. In another case identified as TC2 the test conditions were set at 50% R.H, and used 50% remaining charge as the cut-off level. In the third case identified as TC3 the test conditions were set at 20% R.H. and used 10% remaining charge as cut-off.

Hydrohead of the following examples was measured in a way that is consistent with standard test method EN 20811 and ramping up the pressure at a rate of 60 mbar/min.

Sample Preparation

All samples were made from a SMMMS nonwoven comprising layers of polypropylene meltblown fibers adjacent to two layers of polypropylene continuous filaments and point bonded using a hot calender. The samples made on a 5 beam production line known as a Reicofil 4 (Reifenhäuser Reicofil, Spicher Straße 46, 53844 Troisdorf, Germany). The process consisted of first spinning continuous filaments that are deposed on a foraminous moving surface from Beam 1 and then using Beams 2, 3, and 4 such that three layers of polypropylene meltblown fibers were deposited on top of the layer of continuous filaments. Next, Beam 5 was used to spin continuous filaments that were deposited on top of the meltblown. The composite layer was then fed to the nip point of a calender where it was point bonded.

The first layer of continuous filaments for the samples was about 21.5 gsm, the meltblown layers amounted to about 13 gsm, and the second layer of continuous filaments to be deposited was about 21.5 gsm. The bonding pattern occupied about 16 to 18% of the nonwoven surface.

This fabric was then processed on a pilot line where an ARC (as described below for each sample and comparative sample) was padded on the fabric, the excess ARC was removed to achieve a wet content of about 60 wt % (e.g. the ARC remaining in the fabric weighted about 60% of the weight of the fabric prior to application of the solution), and the fabric was dried using banks of steam cans, where a fabric surface temperature of 120° C. was attained during drying and the dried fabric had no significant wet content (e.g., substantially zero).

Sample 1

The 56 gsm SMMMS described above was treated with an ARC made of de-ionized water containing 1.2% of the fluorochemical emulsion Phobol® NW-MD (about 15.5% solids), available from Huntsman International, LLC, The Woodlands, TX 77387, USA; 0.4% of Zelec® TY (50% solids), a solution containing a phosphate ester type antistatic agent available from Stepan Company, Northfield, IL, 60093, USA; 0.5% of Conpad Binder 2000 FR (40% solids), a non-ionic acrylic binder from Consulmag Corp., South Seaville, NJ 08246, USA; and 0.8% of Alkanol® 6112 (50% solids), a surfactant solution sold by DuPont®, Wilmington, DE 19898, USA.

Sample 2

This sample was made in a way similar to Sample 1 using a different formulation. For that sample the SMMMS was treated with an ARC made of de-ionized water containing 1.6% of Phobol® NW-MD, 0.8% of Zelec® TY and 0.5% of Conpad Binder 2000 FR and 0.8% of Alkanol® 6112.

Comparative Sample 1

The 56 gsm SMMMS described above was treated with an ARC made of de-ionized water containing 1.2% of the fluorochemical emulsion Phobol® NW-MD; 0.4% of Zelec® TY; and 0.8% of Alkanol® 6112.

Comparative Sample 2

The 56 gsm SMMMS described above was treated with an ARC made of de-ionized water containing 1.2% of the fluorochemical emulsion Phobol® NW-MD; 0.9% of Zelec TY; and 0.8% of Alkanol 6112.

Comparative Sample 3

The 56 gsm SMMMS described above was treated with an ARC made of de-ionized water containing 2.5% of the fluorochemical emulsion Phobol® NW-MD; 1.0% of Zelec TY; and 0.8% of Alkanol 6112.

The results of hydrohead, alcohol repellency, and static decay testing for the samples and comparative samples are illustrated in Table 1:

TABLE 1

| Sample | Hydrohead mbar | Alcohol Repellency | | Static Decay method | Static Decay method | Static Decay method |
| --- | --- | --- | --- | --- | --- | --- |
| | | Side A | Side B | TC1 sec | TC2 sec | TC3 sec |
| 1 | 87 | 8 | 8 | 0.35 | 0.02 | 23 |
| 2 | 80 | 8 | 8 | 0.16 | 0.01 | 5.0 |
| C1 | 83 | 6 | 6 | 0.35 | 0.03 | 20 |
| C2 | 61 | 4 | 4 | 0.03 | — | — |
| C3 | 71 | 9 | 9 | 1.7 | — | — |

As shown in Table 1, Samples 1 and 2 provide the best combination of hydrohead, alcohol repellency, and static decay. Because barrier fabrics are frequently used in medical applications such as surgical drapes and gowns, good fluid penetration resistance, as measured by hydrohead, is necessary. Regarding alcohol repellency, for these types of barrier fabrics, alcohol repellency needs to be at least 7, and a common target is 8. Additionally, as previously discussed, static is frequently a problem for barrier fabrics in medical applications. As such, for these types of barrier fabrics, static decay as test by condition TC1 needs to be less than 0.5 seconds.

As discussed above, Sample 1 and Comparative Sample 1 were prepared with the same loading of fluorochemical, antistatic agent, and surfactant. However, Sample 1 included the acrylic binder. As such, Sample 1 demonstrated increased hydrohead and alcohol repellency over Comparative Sample 1, as illustrated in FIGS. 3 and 4 respectively. Comparative Sample 2 and Comparative Sample 1 were similar except that Comparative Sample 2 included a higher antistatic agent content. Accordingly, as illustrated in FIGS. 3 and 4, this increase in antistatic agent in Comparative Sample 2 resulted in lower hydrohead and alcohol repellency as compared to Comparative Sample 1. Furthermore, Comparative Sample 3 had twice the fluorochemical and 2.5 times the antistatic agent contents of Sample 1. With this increase in fluorochemical content, the alcohol repellency of Comparative Sample 3 reached an acceptable level, but the hydrohead increase was small, and the static decay was greater than 1 second despite the high antistatic agent content, as illustrated by FIGS. 3-5.

Thus, by using the acrylic binder in combination with the fluorochemical, the alcohol repellent fabric of Sample 1 meets alcohol repellency levels necessary for surgical and medical applications while using less than half of the fluorochemical typically used. Additionally, by using lower fluorochemical content, the antistatic agent could be used more efficiently. Accordingly, the alcohol repellent fabric of Sample 1 achieved good static decay while using a low level of antistatic agent. As such, while not being limited by theory, we believe that the acrylic binder interacts with the fiber surface and any additives to produce a more uniform additive dispersion on the fiber surface.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

That which is claimed:

1. A topically-treated, alcohol repellent fabric, comprising:
   (a) a fibrous substrate consisting of a plurality of fibers including at least one layer of fine fibers having an average diameter from 1 micron to 10 microns, wherein all of the plurality of fibers comprise one or more polymers that consist of a homopolymer, a random copolymer, a block copolymer, or blends thereof; and
   (b) an alcohol repellent composition (ARC) comprising a mixture of:
      i. from 0.065 to 0.6 wt % of at least one fluorochemical compound on a dry basis of the ARC;
      ii. from 0.02 to 0.4 wt % of at least one binder on a dry basis of the ARC;
      iii. at least one antistatic agent comprising a phosphate ester, a neutralized alcohol phosphate, a fatty quaternary ammonium compound or salt thereof, a fatty amine, an aliphatic amine, an aliphatic amide, a polyethylene glycol ester, or combinations thereof; and
      iv. from 0.2 to 0.6 wt % of at least one surfactant on a dry basis of the ARC;
   wherein a first weight ratio of the at least one fluorochemical compound to the at least one binder, as measured on a dry basis, is from 0.7:1 to 2:1 and the alcohol repellent fabric has a hydro head from about 80 mbar to about 100 mbar as measured by standard test method EN 20811 and ramping up the pressure at a rate of 60 mbar/min.

2. The alcohol repellent fabric according to claim 1, wherein the ARC is directly or indirectly disposed over at least a portion of an outer surface of the fibrous substrate.

3. The alcohol repellent fabric according to claim 1, wherein the ARC comprises a dry coating.

4. The alcohol repellent fabric according to claim 1, wherein the fibrous substrate comprises at least one nonwoven.

5. The alcohol repellent fabric according to claim 4, wherein the one or more polymers is a polypropylene, a polyethylene, a polyester, a polyamide, or any combination thereof.

6. The alcohol repellent fabric according to claim 1, wherein the at least one fluorochemical compound comprises at least one of a C4 fluorochemical, a C6 fluorochemical, a C8 fluorochemical, a C10 fluorochemical, or any combination thereof.

7. The alcohol repellent fabric according to claim 1, wherein the at least one binder comprises at least one of an acrylic binder, a styrene-butadiene rubber binder, a vinyl copolymer binder, a vinyl acetate binder, an ethylene vinyl acetate binder, a polyvinyl chloride binder, a polyurethane binder, or any combination thereof.

8. The alcohol repellent fabric according to claim 7, wherein the at least one binder comprises an acrylic binder.

9. The alcohol repellent fabric according to claim 8, wherein the acrylic binder comprises an anionic acrylic binder, a cationic acrylic binder, or a non-ionic acrylic binder.

10. The alcohol repellent fabric according to claim 1, wherein the ARC comprises a second weight ratio of the at least one antistatic agent to the at least one binder, as measured on a dry basis, from 1:1 to 2:1, and a third weight ratio of the at least one antistatic agent to the at least one fluorochemical compound, as measured on a dry basis, from 1.1 to 1.67:1.

11. The alcohol repellent fabric according to claim 1, wherein the alcohol repellent fabric has one or more of the following: (i) an alcohol repellency rating of at least 7 as measured by the harmonized test method WSP 80.85; (ii) a static decay as tested using the TC1 condition from about 0.01 seconds to about 0.5 seconds as measured by standard test method NFPA 99 performed at 50% R.H. using 10% remaining charge as the cut-off level; and (iii) a hydrohead from about 80 mbar to about 90 mbar as measured by standard test method EN 20811 and ramping up the pressure at a rate of 60 mbar/min.

12. A process for forming a topically-treated, alcohol repellent fabric, comprising:
   (a) providing a fibrous substrate consisting of a plurality of fibers including at least one layer of fine fibers having an average diameter from 1 micron to 10 microns, wherein all of the plurality of fibers comprise one or more polymers that consist of a homopolymer, a random copolymer, a block copolymer, or blends thereof and
   (b) topically applying an alcohol repellent composition (ARC) to at least a first portion of a first outer surface and to at least a second portion of a second outer surface of the fibrous substrate to form the alcohol repellent fabric, wherein the ARC comprises a mixture of from 0.065 to 0.6 wt % of at least one
   fluorochemical compound on a dry basis of the ARC, from 0.02 to 0.4 wt % of at least one binder on a dry basis of the ARC, at least one antistatic agent; and from 0.2 to 0.6 wt % of at least one surfactant on a dry basis of the ARC; wherein a first weight ratio of the at least one fluorochemical compound to the at least one binder, as measured on a dry basis, is from 0.7:1 to 2:1, and the alcohol repellent fabric has a hydro head from about 80 mbar to about 100 mbar as measured by standard test method EN 20811 and ramping up the pressure at a rate of 60 mbar/min; and
   wherein the at least one antistatic agent comprises a phosphate ester, a neutralized alcohol phosphate, a fatty quaternary ammonium compound or salt thereof, a fatty amine, an aliphatic amine, an aliphatic amide, a polyethylene glycol ester, or combinations thereof.

13. The process according to claim 12, wherein topically applying the ARC to the fibrous substrate comprises at least one of padding, spraying, printing, foaming, or any combination thereof.

14. The process according to claim 12, further comprising:
   (a) removing excess ARC from the alcohol repellent fabric; and
   (b) drying the alcohol repellent fabric to provide a dried alcohol repellent fabric.

15. The alcohol repellent fabric according to claim 1, wherein at least one layer of fine fibers comprises meltblown fibers, melt film fibrillation fibers, or sub-micron fibers.

16. The alcohol repellent fabric according to claim 1, wherein the fibrous substrate comprises a first outer spunbond layer, a second outer spunbond layer, and at least two adjacent meltblown layers located between the first outer spunbond layer and the second outer spunbond layer; the at least two adjacent meltblown layers comprising fine fibers having an average diameter from 1 to 10 microns.

17. The alcohol repellent fabric according to claim 1, wherein the alcohol repellent fabric is provided in the form of surgical gown or a surgical drape.

18. The alcohol repellent fabric according to claim 1, wherein the one or more polymers is a polypropylene homopolymer.

19. A topically-treated, alcohol repellent fabric, comprising:
(a) a fibrous substrate consisting of:
  (i) a first outer spunbond layer consisting of a plurality of first continuous fibers formed from one or more polymers consisting of a homopolymer, a random copolymer, a block copolymer, or blends thereof;
  (ii) a second outer spunbond layer consisting of a plurality of second continuous fibers formed from one or more polymers consisting of a homopolymer, a random copolymer, a block copolymer, or blends thereof; and
  (iii) at least two adjacent meltblown layer located between the first outer spunbond layer and the second outer spunbond layer, that at least two adjacent meltblown layers consist of a plurality of fine fibers formed from one or more polymers consisting of a homopolymer, a random copolymer, a block copolymer, or blends thereof, and wherein the at least two adjacent meltblown layers have an average diameter from 1 to 10 microns;
(b) an alcohol repellent composition (ARC) comprising a mixture of:
  i. from 0.065 to 0.6 wt % of at least one fluorochemical compound on a dry basis of the ARC; and
  ii. from 0.02 to 0.2 wt % of at least one binder on a dry basis of the ARC;
  iii. at least one antistatic agent comprising a phosphate ester, a neutralized alcohol phosphate, a fatty quaternary ammonium compound or salt thereof, a fatty amine, an aliphatic amine, an aliphatic amide, a polyethylene glycol ester, or combinations thereof; and
  iv. from 0.2 to 0.6 wt % of at least one surfactant on a dry basis of the ARC;
  wherein a first weight ratio of the at least one fluorochemical compound to the at least one binder, as measured on a dry basis, is from 0.7:1 to 2:1.

20. The alcohol repellent fabric according to claim 19, wherein the plurality of first continuous fibers, the plurality of second continuous fibers, and the plurality of fine fibers all consist of a polyolefin homopolymer, a polypropylene-polyethylene random copolymer, or a polypropylene-polyethylene block copolymer.

21. The process according to claim 12, wherein topically applying the ARC to the fibrous substrate comprises submerging the fibrous substrate in a bath of the ARC.

22. The process according to claim 12, wherein topically applying the ARC to the fibrous substrate comprises (i) padding the ARC, spraying the ARC, printing the ARC, foaming the ARC, or any combination thereof to the first outer surface, and (ii) padding the ARC, spraying the ARC, printing the ARC, foaming the ARC, or any combination thereof to the second outer surface.

23. The alcohol repellent fabric according to claim 1, wherein the ARC comprises from 0.065 to 0.35 wt. % of the at least one fluorochemical compound on a dry basis of the ARC and from 0.4 to 0.6 wt % of the at least one surfactant on a dry basis of the ARC.

24. The alcohol repellent fabric according to claim 1, wherein the alcohol repellent fabric consists of the fibrous substrate and the ARC, and wherein the ARC consists of i. the at least one fluorochemical compound; ii. the at least one binder; iii. the at least one antistatic agent; and iv. the at least one surfactant.

25. The alcohol repellent fabric according to claim 1, wherein the at least one antistatic agent comprises a phosphate ester.

26. The alcohol repellent fabric according to claim 1, wherein the ARC comprises from 0.065 to 0.5 wt % of at least one fluorochemical compound on a dry basis of the ARC.

27. The alcohol repellent fabric according to claim 1, wherein the ARC comprises from 0.065 to 0.4 wt % of at least one fluorochemical compound on a dry basis of the ARC.

* * * * *